United States Patent [19]
Nakashima et al.

[11] Patent Number: 6,002,530
[45] Date of Patent: *Dec. 14, 1999

[54] LENS BARREL AND OPTICAL APPARATUS

[75] Inventors: Shigeo Nakashima; Naoya Kaneda, both of Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/575,703

[22] Filed: Dec. 19, 1995

[30] Foreign Application Priority Data

| Dec. 22, 1994 | [JP] | Japan | .................................... 6-336064 |
| Feb. 2, 1995 | [JP] | Japan | .................................... 7-037671 |
| Feb. 2, 1995 | [JP] | Japan | .................................... 7-037672 |

[51] Int. Cl.$^6$ .................................................. G02B 15/14
[52] U.S. Cl. ........................................ 359/700; 359/701
[58] Field of Search ................................... 359/698, 700, 359/701, 823

[56] References Cited

U.S. PATENT DOCUMENTS

| 4,920,369 | 4/1990 | Kaneda et al. ........................... 354/400 |
| 4,999,656 | 3/1991 | Shimizu et al. ................... 354/195.12 |
| 5,060,001 | 10/1991 | Kaneda ................................... 354/400 |
| 5,134,525 | 7/1992 | Kaneda ................................... 359/697 |
| 5,164,757 | 11/1992 | Nomura ................................... 354/403 |
| 5,264,966 | 11/1993 | Okada et al. ........................... 359/696 |
| 5,486,888 | 1/1996 | Shiina et al. ............................ 354/187 |

FOREIGN PATENT DOCUMENTS

| 4-273207 | 9/1992 | Japan . |
| 5-100144 | 4/1993 | Japan . |

*Primary Examiner*—Georgia Epps
*Assistant Examiner*—Ricky Mack
*Attorney, Agent, or Firm*—Fitzpatrick, Cella, Harper & Scinto

[57] ABSTRACT

In a lens barrel or an optical apparatus using the lens barrel, a first holding frame which holds a first lens and a second holding frame which holds a second lens are arranged to engage one and the same cam member, a cam disposed in the cam member is arranged to move the first and second holding frames along an optical axis, while keeping the relative positions of the first and second holding frames unvaried when shooting is not performed, and the second holding frame is moved in the direction of the optical axis while the first holding frame is kept stationary in the direction of the optical axis when shooting is performed. The first lens is located nearest to an object side within the lens barrel while the second lens is arranged to be movable along the optical axis for varying a magnifying power.

33 Claims, 24 Drawing Sheets

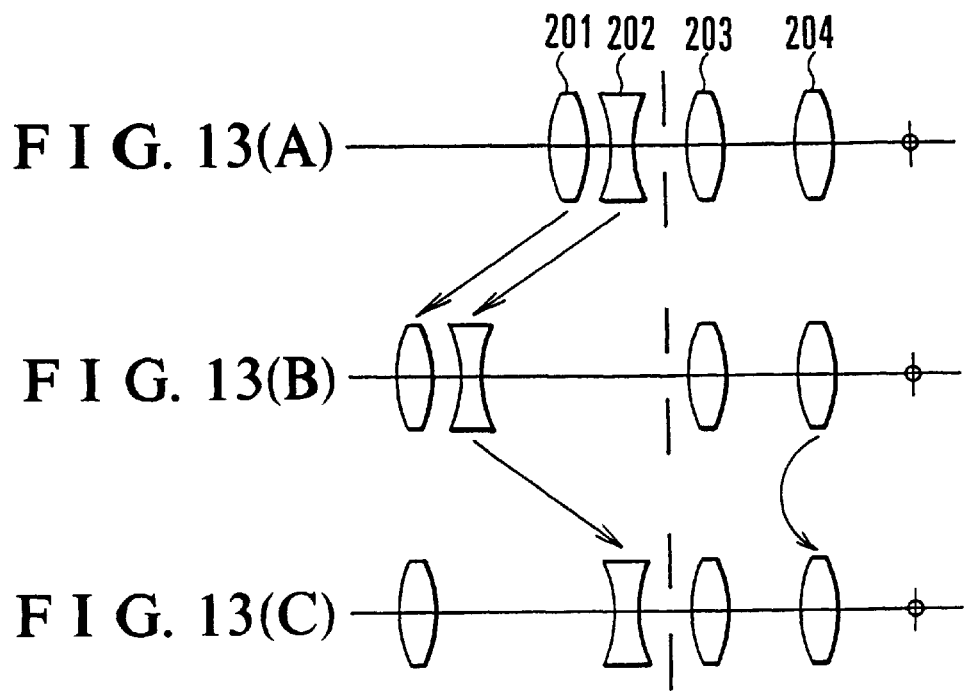
FIG. 13(A)
FIG. 13(B)
FIG. 13(C)
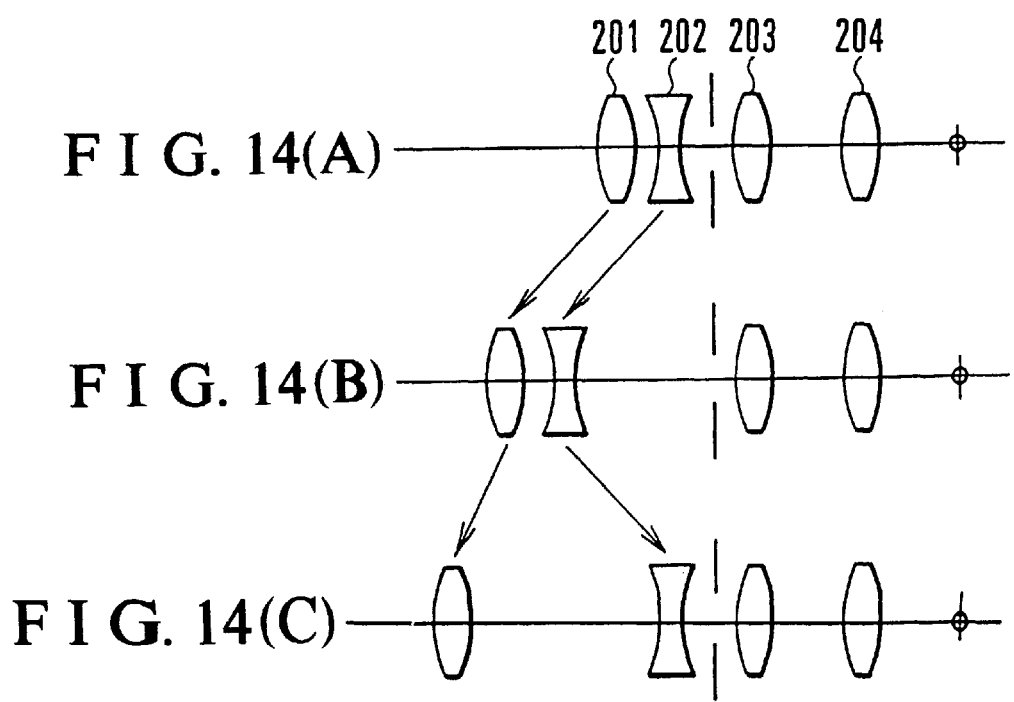
FIG. 14(A)
FIG. 14(B)
FIG. 14(C)

LENS BARREL AND OPTICAL APPARATUS

BACKGROUND OF THE INVENTION

1. Field of the Invention

This invention relates to a lens barrel and an optical apparatus using the same, and more particularly to a lens barrel which contains therein a so-called front-lens-fixed type zoom lens in which a first lens group located nearest to an object side is fixed when shooting is performed or a so-called mono-focal-length lens or the like, the lens barrel being arranged to be in a compact size as a whole when shooting is not performed and to be highly suited, for example, for a video camera excelling in portability.

2. Description of the Related Art

Optical apparatuses such as video cameras have heretofore been arranged to use various front-lens-fixed type zoom lenses. In each of the zoom lenses, the first lens group located nearest to the object side is stationary in carrying out, for example, zooming and focusing actions when shooting is performed. A lens barrel having the front-lens-fixed type zoom lens contained therein has generally been arranged to have a first holding frame which holds the first lens group fixedly attached to a fixed member (a fixed tube). Therefore, the total length of the lens barrel remains unvarying both when shooting is performed and when shooting is not performed.

FIG. 1 is a sectional view showing the essential parts of the conventional front-lens-fixed type lens barrel. Referring to FIG. 1, a fixed member 1 has an image sensor which is not shown. A third holding frame 2 is arranged to hold an afocal lens L3 (a third lens group) and is secured to the fixed member 1. A fourth holding frame 3 is arranged to hold a relay lens L4 and to be movable in the direction of an optical axis while being guided by bars 4 and 5 which are fixed by the fixed member 1 and the third holding frame 2. The fourth holding frame 3 is thus arranged to be movable along the optical axis by a driving force of a driving motor 6 through a feed screw. A first holding frame 7 is arranged to hold a first lens group L1 and is secured to the fixed member 1 by means of a screw 8.

A second holding frame 9 is arranged to hold a second lens group L2 and is movable in the direction of the optical axis while being guiding by bars 10 and 11 which are fixed between the first holding frame 7 and the fixed member 1. The second holding frame 9 is thus arranged to be movable along the optical axis by the driving force of a driving motor 12 through a feed screw.

In the lens barrel having the front-lens-fixed type zoom lens contained therein as shown in FIG. 1, the first holding frame 7 is secured to the fixed member 1. Therefore, the total length of the lens barrel remains unvarying both when shooting is performed and when shooting is not performed, and even when shooting is not performed, the first lens group L1 is arranged to protrude toward the object side.

Camera-integrated type video cameras of the kind having liquid crystal monitors which have recently begun to appear in the market are arranged to have the whole camera length shortened in the direction of the optical axis of the phototaking lens. Use of a photo-taking lens having a lens barrel extending long in the direction of the optical axis for a video camera of that kind poses a problem as the photo-taking lens is alone left protruding in the direction of the optical axis even when shooting is not performed, thereby degrading the portability of the video camera.

SUMMARY OF THE INVENTION

This invention is directed to reduction in size of a lens barrel for improved portability of an optical apparatus when shooting is not performed. It is, therefore, a principal object of this invention to provide a lens barrel which is advantageously adapted, for example, for a camera-integrated type video camera or the like and is compactly arranged for improved portability or an optical apparatus which is arranged to use the lens barrel.

In accordance with a first aspect of the lens barrel or the optical apparatus, a first holding frame which holds a first lens located nearest to an object side is fixed when shooting is performed, and a moving mechanism is arranged to cause the first holding frame to become movable toward an image side when shooting is not performed.

In accordance with a second aspect of the lens barrel or the optical apparatus according to this invention, a first holding frame which holds a first lens located nearest to an object side is fixed when shooting is performed, and a moving mechanism is arranged to cause the first holding frame to become movable toward an image side when shooting is not performed, after or while causing a movable holding frame which holds a movable lens located nearer to an image side than the first lens and arranged to move during zooming and/or focusing to move to a predetermined position.

In accordance with a third aspect of the lens barrel or the optical apparatus according to this invention, a first holding frame which holds a first lens located nearest to an object side is fixed when shooting is performed, and a moving mechanism is arranged to cause the first holding frame to become movable toward an image side when shooting is not performed, after or while causing a second holding frame which holds a second lens located on an image side of the first lens and arranged to move during zooming and/or focusing to move to one end on the object side of a movable range of the second holding frame.

Each of the aspects mentioned above may be arranged in various manners as will be described later herein through the description of embodiments. For example, a load is imposed from one direction on the first holding frame when shooting is performed, a helicoid mechanism is used for the moving mechanism, and the first holding frame is arranged to be rectilinearly moved.

Further, in a case where the lens system in the first, second or third aspect is a mono-focal-length lens, the first lens is arranged not to be moved for the purpose of focusing. If the lens system is a zoom lens, the first lens is not moved for focusing and zooming.

A fourth aspect of the lens barrel or the optical apparatus according to this invention is characterized in that a first holding frame which holds a first lens and a second holding frame which holds a second lens are arranged to engage one and the same cam means, a cam disposed in the cam means is arranged to move the first and second holding frames in the direction of an optical axis when shooting is not performed while keeping the relative positions of the first and second holding frames constant, and, when shooting is performed, the second holding frame is moved in the direction of the optical axis while the first holding frame is kept stationary in the direction of the optical axis. In an embodiment described later herein, the first lens is located nearest to the object side and the second lens is arranged to be movable in the direction of the optical axis during zooming.

A fifth aspect of the lens barrel or the optical apparatus according to this invention is characterized in that: a first holding frame which holds a first lens and a second holding frame which holds a second lens are arranged to engage one and the same cam means, a cam disposed in the cam means is arranged to vary a distance between the first and second holding frames in the direction of an optical axis during zooming, and, when zooming is not performed, to be capable of moving the first holding frame and the second holding frame in the direction of the optical axis without varying the relative positions of the first and second holding frames by causing a cam lift of a cam provided on the second holding frame to be zero. In an embodiment described later herein, the cam is arranged to cause the second holding frame to move, when zooming is not performed, to a telephoto-end zoom position from which the second holding frame is movable by the zooming. In another embodiment described later herein, the first holding frame is arranged to be stationary in the direction of the optical axis when zooming is performed.

In a further embodiment described later herein, the above-stated cam has a cam part arranged to restrict the position of the first holding frame in the direction of the optical axis within a first area which corresponds to a first operation range of the above-stated cam means, to restrict the positions of the first and second holding frames in the direction of the optical axis within a second area which corresponds to a second operation range continuing from an end of the first operation range and to restrict the position of the second holding frame in the direction of the optical axis within a third area which corresponds to a third operation range continuing from one end of the second operation range, and the position of the second holding frame is restricted in the second area when the position of the first holding frame is restricted in the first area and the position of the first holding frame is restricted in the second area when the position of the second holding frame is restricted in the third area. In another embodiment described later herein, the cam lift in the above-stated first area and/or in the second area is arranged to be zero, and, in shifting the lens barrel to a retracted or stowed state, the position of the second holding frame is restricted in the area where the cam part has zero cam lift.

A sixth aspect of the lens barrel or the optical apparatus according to this invention is characterized in that: a first holding frame which holds a first lens and a second holding frame which holds a second lens are arranged to engage one and the same cam ring, and the cam ring is provided with a cam mechanism which is arranged to vary a distance between the first and second holding frames according to a rotating operation on the cam ring when shooting is performed and, when shooting is not performed, i.e., in stowing and retracting the lens barrel, to have the first and second holding frames movable in the direction of an optical axis by the rotating operation on the cam ring without varying the relative positions of the first and second holding frames. In an embodiment described later herein, the first holding frame is arranged to remain stationary when shooting is performed.

A seventh aspect of the lens barrel or the optical apparatus according to this invention is characterized in that: a first holding frame which holds a first lens and a second holding frame which holds a second lens are arranged to engage one and the same cam ring, and the cam ring is provided with a cam mechanism which is arranged to vary a distance between the first and second holding frames in the direction of an optical axis when zooming is performed and, when zooming is not performed, i.e., in stowing and retracting the lens barrel, to allow the first and second holding frames to be moved toward an image side from a wide-angle end position without varying the relative positions of the first and second holding frames.

In an embodiment described later herein, the above-stated cam mechanism is arranged to move, at the time of stowing the lens barrel, the second holding frame to a telephoto-end zoom position from which the second holding frame is movable by the zooming. In another embodiment described later herein, the cam mechanism is formed by using one cam member including a slanting cam part which has a predetermined value of cam lift and cam parts which continue from both ends of the slanting cam part and have zero cam lift.

An eighth aspect of the lens barrel or the optical apparatus according to this invention is characterized in that: a first holding frame which holds a first lens and a second holding frame which holds a second lens are arranged to engage one and the same cam ring, and the cam ring is provided with a cam mechanism which is arranged to vary a distance between the first and second holding frames in the direction of an optical axis when zooming is performed and, when zooming is not performed, to cause the cam lift of the cam mechanism provided for the second holding frame to become zero while causing the first holding frame to become movable in the direction of the optical axis. In an embodiment described later herein, the cam mechanism is arranged to move, when zooming is not performed, the second holding frame to a telephoto-end zoom position from which the second holding frame is movable by the zooming.

A ninth aspect of the lens barrel or the optical apparatus according to this invention is characterized in that: with the lens barrel having a lens holding frame which holds a lens and is arranged to be driven through a cam mechanism and position detecting means for detecting the position of the lens holding frame, the cam mechanism includes first and second cam parts, and each element is set in such a manner that, for the same driving direction of the cam mechanism, the first and second cam parts act to reverse a direction in which the output of the position detecting means varies.

In an embodiment described later herein, the first cam part of the above-stated cam mechanism is arranged to be used for retracting the lens holding frame into a stowed position when shooting is not performed and the second cam part is arranged to be used for moving the lens holding frame along an optical axis when shooting is performed.

A tenth aspect of the lens barrel or the optical apparatus is characterized in that: with the lens barrel having a first holding frame which holds a first lens located nearest to an object side and is arranged to be stationary when shooting is performed, a second holding frame which holds a second lens and is arranged to be moved through a cam mechanism during zooming and position detecting means for detecting the position of the second holding frame, the cam mechanism includes a first cam part which is arranged to cause the first and second holding frames to be drawn in toward an image side when shooting is not performed and a second cam part which is arranged to cause the second holding frame to move when shooting is performed, and each element is set in such a manner that, for the same driving direction of the cam mechanism, the first and second cam parts act to reverse a direction in which the output of the position detecting means varies.

The above and other objects and features of this invention will become apparent from the following detailed description of embodiments thereof taken in connection with the accompanying drawings.

BRIEF DESCRIPTION OF THE DRAWINGS

FIGS. 13(A), 13(C), and 13(D) are sectional views of lenses of a zoom lens which relates to the third embodiment.

FIGS. 14(A), 14(C), and 14(D) are sectional views of lenses of a zoom lens relating to a fourth embodiment of this invention.

FIGS. 21(A), 21(C), and 21 (D) are sectional views of lenses of a zoom lens which corresponds to FIGS. 19 and 20.

Detailed Description of the Preferred Embodiments

Figure 1:
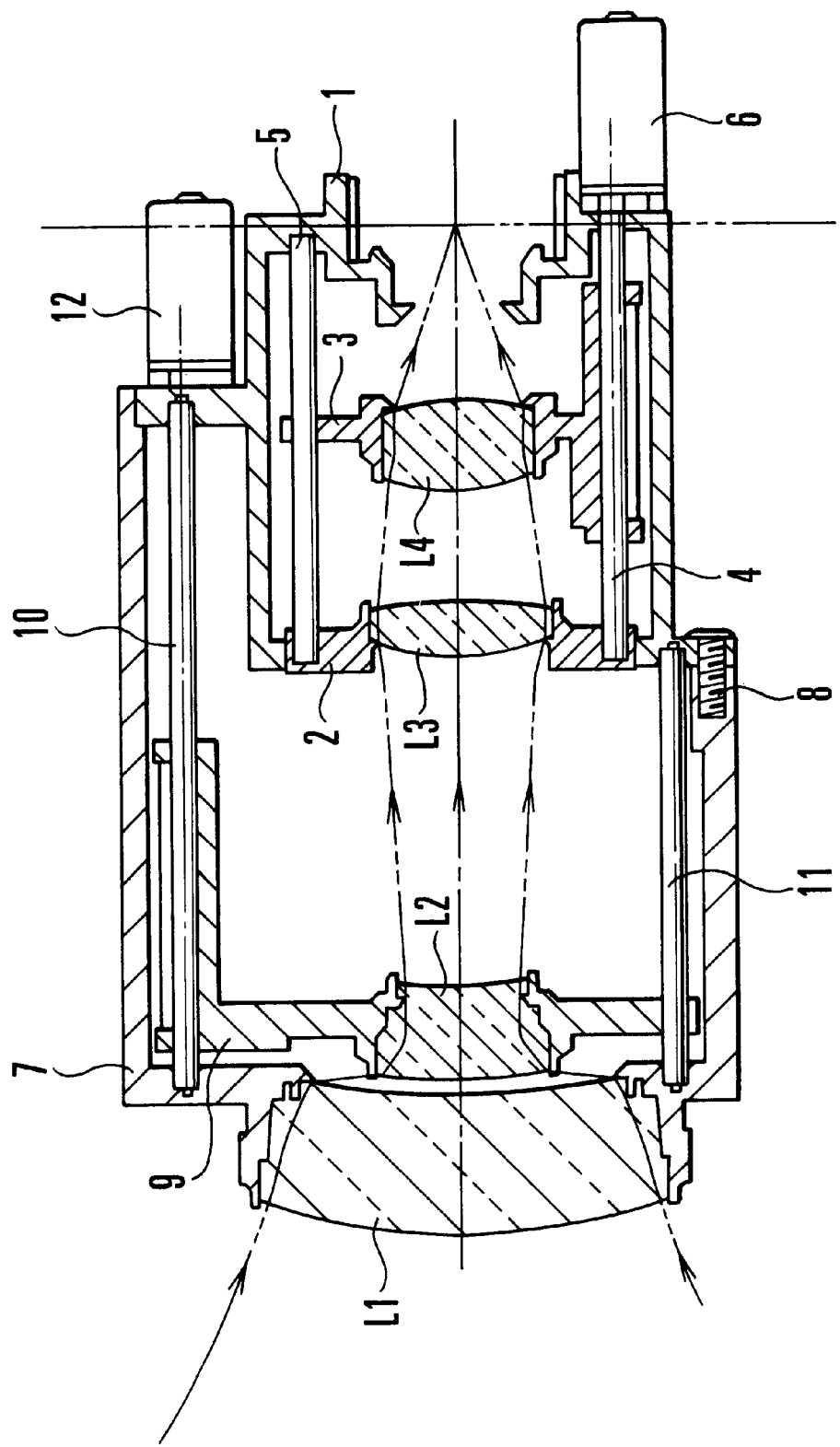
FIG. 1 is a sectional view showing the essential parts of a conventional front-lens-fixed type lens barrel.
Figure 2:
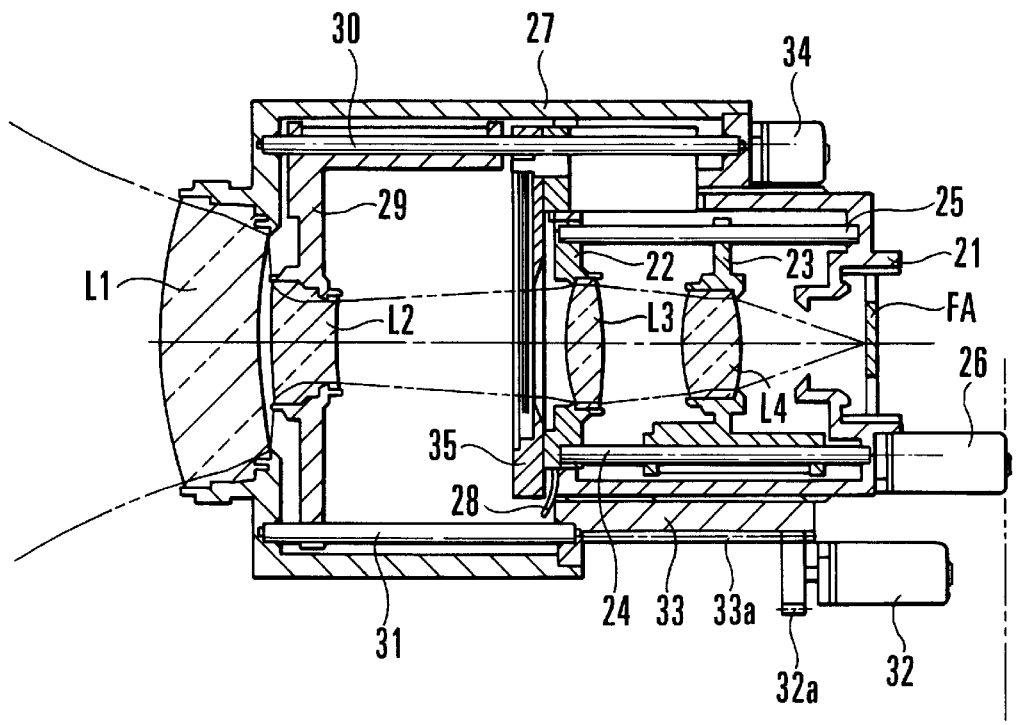
FIG. 2 is a sectional view showing the essential parts of a lens barrel which is a first embodiment of this invention as illustrated when shooting is performed.

FIG. 2 shows in a sectional view the essential parts of a lens barrel which is arranged according to this invention as a first embodiment thereof. Referring to FIG. 2, a first lens group L1 is arranged to remain stationary when shooting is performed (taking a shot with zooming and focusing actions). A second lens group L2 is arranged to move along an optical axis during zooming. A third lens group L3 is arranged to remain stationary when shooting is performed. A fourth lens group L4 is arranged to move along the optical axis for correcting fluctuations of an image plane resulting from zooming and also to move for focusing.

A fixed member (a fixed tube) 21 is arranged to fixedly hold an image sensor FA. A first holding frame 27 is arranged to hold the first lens group L1. A second holding frame 29 is a movable holding frame which is arranged to hold the second lens group L2. Bars 30 and 31 which are fixed between the first holding frame 27 and a female helicoid tube 33 are arranged to enable the second holding frame 29 to be moved in the direction of the optical axis.

The female helicoid tube 33 is secured to the first holding frame 27 and is coupled with a helicoid provided on the outer circumferential part of the fixed member 21. A biasing spring 28 is arranged to keep the female helicoid tube 33 at one side thereof when shooting is performed. The second holding frame 29 is arranged to cause the second lens group L2 to perform a zooming action under a driving force of a driving motor 34 transmitted through a feed screw to move in the direction of the optical axis. A third holding frame 22 holds the third lens group L3 and is secured to the fixed member 21. A fourth holding frame 23 holds the fourth lens group L4 and is arranged to be movable in the direction of the optical axis along bars 24 and 25 which are arranged between the third holding frame 22 and the fixed member 21. The fourth holding frame 23 is movable by a driving force of a driving motor 26 through a feed screw in the direction of the optical axis, in such a way as to enable the fourth lens group L4 to correct fluctuations of an image plane resulting from a zooming action and also to perform a focusing action. A driving motor 32 is arranged to cause, when shooting is not performed, driving the first lens group L1, i.e., the first holding frame 27, to rectilinearly move along the optical axis through the intermeshing of its output gear 32a and a gear 33a provided on the outer circumferential part of the female helicoid tube 33, in such a way as to retract the first lens group L1. An iris unit 35 is attached to the third holding frame 22.

In the case of this embodiment, a zooming action is carried out by driving the second lens group L2 and the fourth lens group L4 to move along the optical axis by means of the driving motors 34 and 26. Further, a focusing action is carried out by moving the fourth lens group L4 along the optical axis. When shooting is not performed, the first holding frame 27 which is arranged to remain stationary when shooting is performed is driven by the driving motor 32 to move along the optical axis toward the image side.

Figure 6:
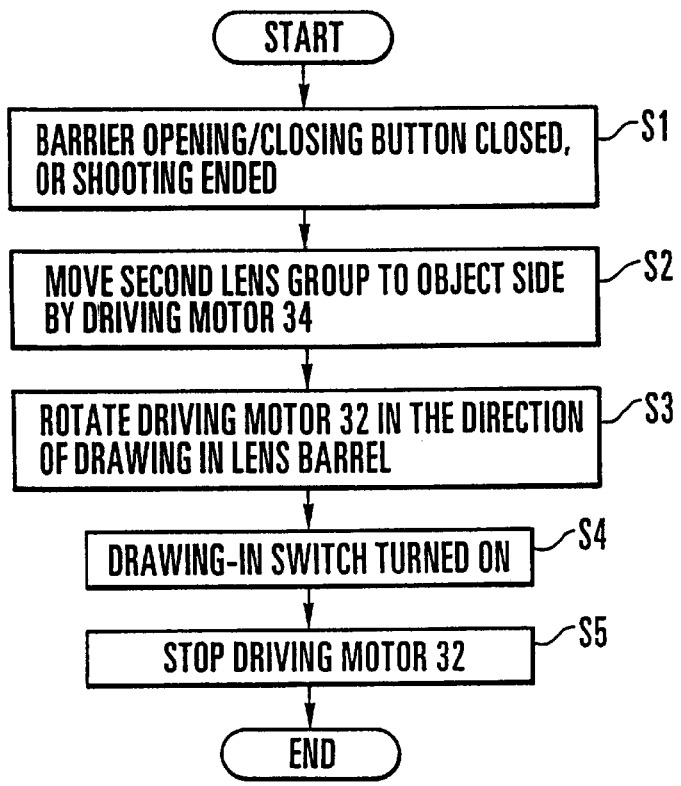
FIG. 6 is a flow chart showing an operation of the lens barrel which is the first embodiment.

FIG. 6 shows in a flow chart the processes of moving the first holding frame 27.

Figure 3:
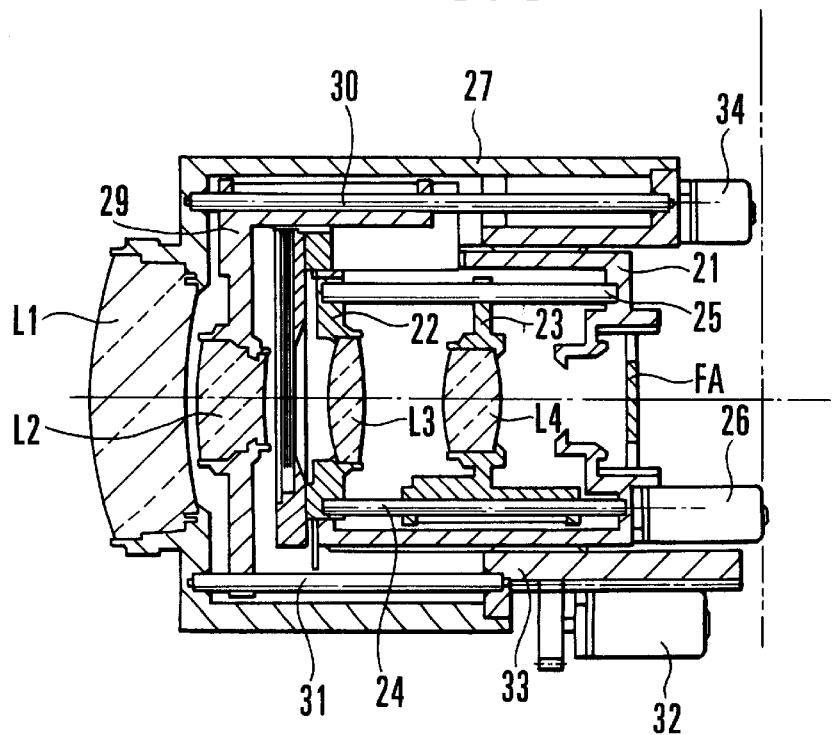
FIG. 3 is a sectional view showing the essential parts of the lens barrel which is the first embodiment as illustrated when shooting is not performed.

Referring to FIG. 6, the moving process for the first holding frame 27 is described as follows: At a step S1, when a shooting preparation mode switch is turned off or when a barrier opening/closing button of the photo-taking lens of the lens barrel comes to a closing position, in the state shown in FIG. 2 where shooting is performed, a shooting operation comes to an end. At a step S2, the second lens group L2 is moved by the driving motor 34 to a position on the object side within its movable range. At a step S3, the helicoid tube 33 is rotated by the driving motor 32 to cause the first lens group L1 to move to its position on the image side. This motion results in a state which is as shown in FIG. 3. As shown, the length of the lens barrel in the direction of the optical axis is shortened by this step. At a step S4, a switch which is arranged to detect arrival of the first lens group Li in a predetermined position on the image side comes to detect that the first lens group L1 is moved by a predetermined amount. At a step S, the motion of the first lens group L1 is brought to a stop by bringing the driving motor 32 to a stop.

A process of changing the state of FIG. 3 where shooting is not performed into the state of FIG. 2 where shooting is performed, i.e., a process of moving the first lens group L1 along the optical axis toward the object side, is next described with reference to FIG. 7 which is a flow chart.

Figure 7:
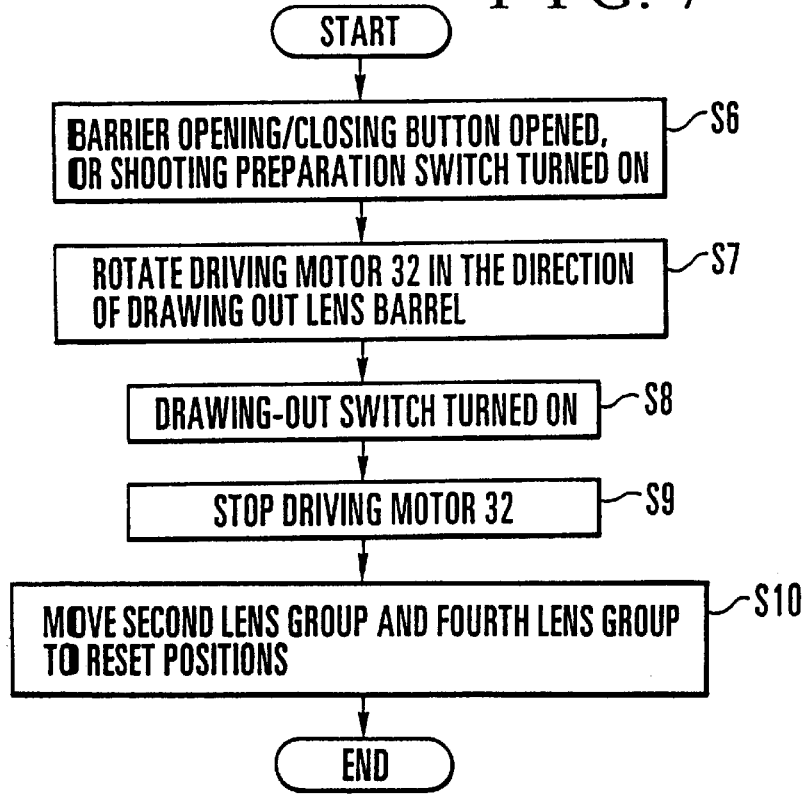
FIG. 7 is a flow chart showing another operation of the lens barrel which is the first embodiment.

At a step S6 shown in FIG. 7, when the shooting preparation mode switch turns on or when the button provided for opening and closing the barrier of the photo-taking lens opens, the apparatus is in the shooting state or in a state of being ready for shooting.

At a step S7, the female helicoid tube 33 is drawn out (toward the object side) by the driving motor 32. The first lens group L1 is moved by this to a predetermined position on the object side. At a step S8, a switch which is arranged to detect the drawn-out motion of the first lens group L1 to this position detects that the first lens group L1 is drawn out to this position. At a step S9, the first lens group L1 is brought to a stop by bringing the driving motor 32 to a stop. As a result, the shooting or shootable state is obtained as shown in FIG. 2. At a step S10, in the shootable state, the driving motors 34 and 26 are driven to move the second lens group L2 and the fourth lens group L4 to their initial positions. Further, in the shootable state of FIG. 2, when the first lens group L1 is drawn out toward the object side, the female helicoid tube 33 is biased by the biasing spring 28 to leave no play at its helicoid part to ensure that the first lens group L1 is accurately positioned.

Figure 4:
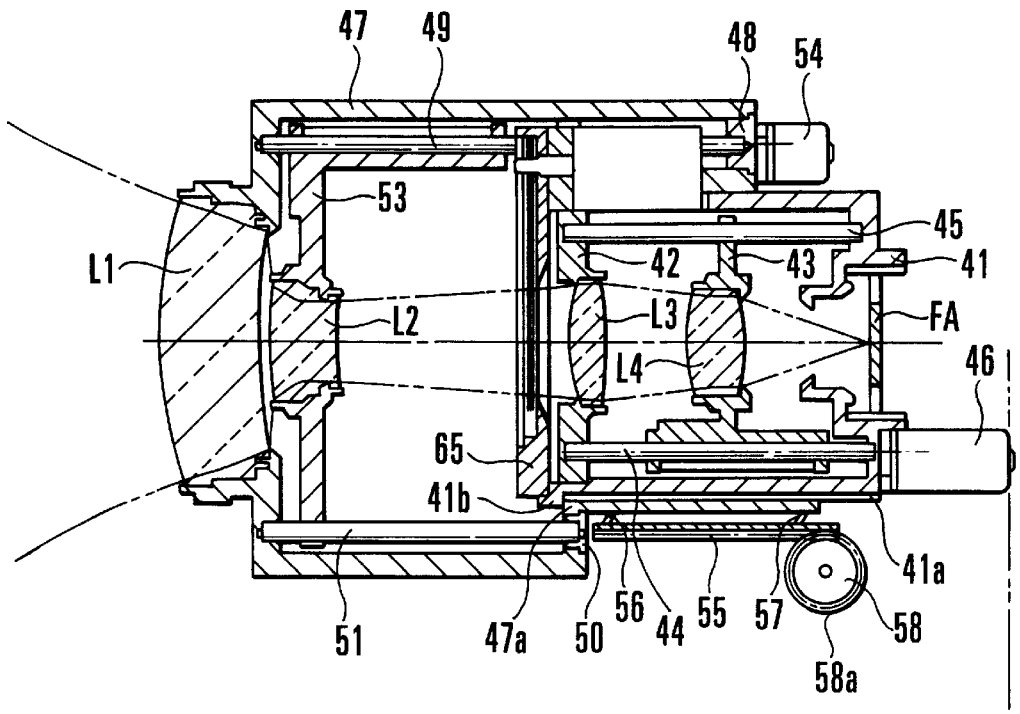
FIG. 4 is a sectional view showing the essential parts of a lens barrel which is a second embodiment of this invention as illustrated when shooting is performed.

FIG. 4 is a sectional view showing the essential parts of a lens barrel which is arranged also according to this invention as a second embodiment thereof. Referring to FIG. 4, a first lens group L1 is arranged to remain stationary when shooting is performed. A second lens group L2 is arranged to move along an optical axis for varying the magnifying power, i.e., for zooming. A third lens group L3 is arranged to remain stationary when shooting is performed. A fourth lens group L4 is arranged to move along the optical axis both for correcting any fluctuations of an image plane resulting from the magnifying-power-varying (zooming) action and for performing a focusing action.

A fixed member (fixed tube) 41 is arranged to fixedly hold an image sensor FA. A first holding frame 47 is arranged to hold the first lens group L1. The inner side of a smaller diameter part of the first holding frame 47 located on the image side is fitted on the outer circumferential side of the fixed member 41 and is arranged to be rectilinearly movable by means of a rectilinear moving key 41a. A second holding frame 53 holds the second lens group L2 and is movable along the optical axis by means of bars 49 and 51.

The second holding frame 53 is arranged to allow the second lens group L2 to perform the power-varying action by being moved in the direction of the optical axis through a feed screw by a driving force of the driving motor 54. A third holding frame 42 holds the third lens group L3 and is secured to the fixed member 41. A fourth holding frame 43 holds the fourth lens group L4 and is movable along the optical axis by means of bars 44 and 45 arranged between the third holding frame 42 and the fixed member 41. The fourth holding frame 43 is thus arranged to allow the fourth lens group L4 to correct image plane fluctuations resulting from the magnifying-power-varying action and also to perform focusing by being moved in the direction of the optical axis through a feed screw by a driving force of the driving motor 46. A rack gear 55 is attached to the first holding frame 47 by means of elastic members 56 and 57. The output gear 58a of a driving motor 58 is coupled with the rack gear 55. An iris unit 65 is attached to the third holding frame 42.

In the case of the second embodiment described above, the magnifying-power-varying action is performed with the second lens group L2 and the fourth lens group L4 driven to move along the optical axis respectively by the driving motors 54 and 46. Further, the focusing action is performed by moving the fourth lens group L4 along the optical axis. In performing the magnifying-power-varying and focusing actions, the first holding frame 47 which is arranged to remain stationary when shooting is performed is moved along the optical axis toward the image side by moving the rack gear 55 by the rotation of the output gear 58a of the driving motor 58.

Figure 5:
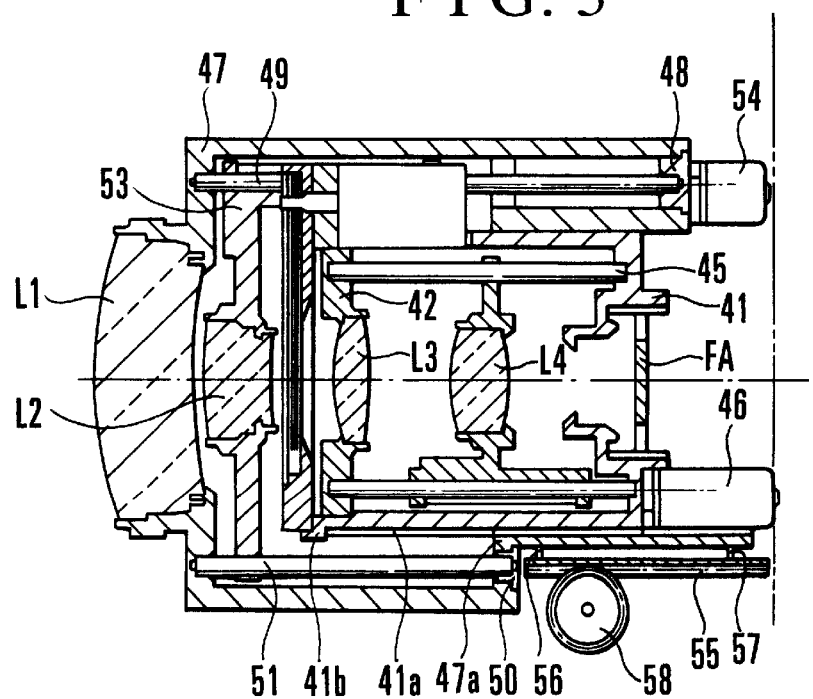
FIG. 5 is a sectional view showing the essential parts of the lens barrel which is the second embodiment as illustrated when shooting is not performed.
Figure 8:
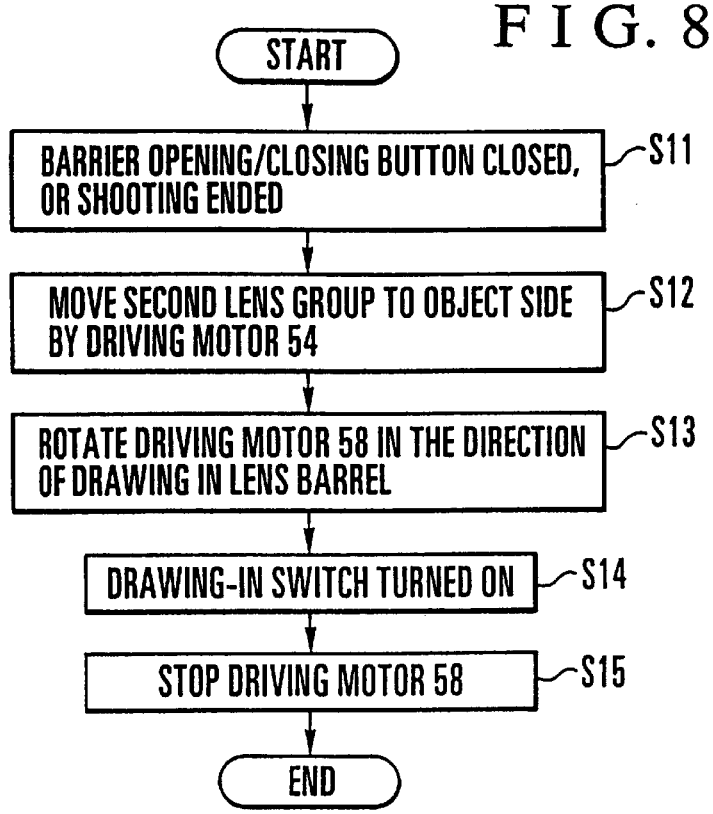
FIG. 8 is a flow chart showing an operation of the lens barrel which is the second embodiment.

The process of the above-stated moving action is described with reference to FIG. 8 which is a flow chart as follows: At a step S11 of FIG. 8, with the lens barrel in the shootable state as shown in FIG. 4, when a shooting preparation mode switch is turned off or when the button for opening and closing the barrier of the photo-taking lens is closed, a shooting operation comes to an end. At a step S12, the second lens group L2 is moved by the driving motor 54 to its position on the object side within its movable range. At a step S13, the first lens group L1 is moved toward the image side by driving the rack gear 55 toward the image side with the driving motor 58. FIG. 5 shows the lens barrel as in a state thus obtained. As shown, the length of the lens barrel in the direction of the optical axis is shortened.

At a step S14, a switch arranged to detect arrival of the first lens group L1 in a predetermined position on the image side detects that the first lens group L1 has come to this position. At a step S15, the first lens group L1 is brought to a stop by bringing the driving motor 58 to a stop.

Figure 9:
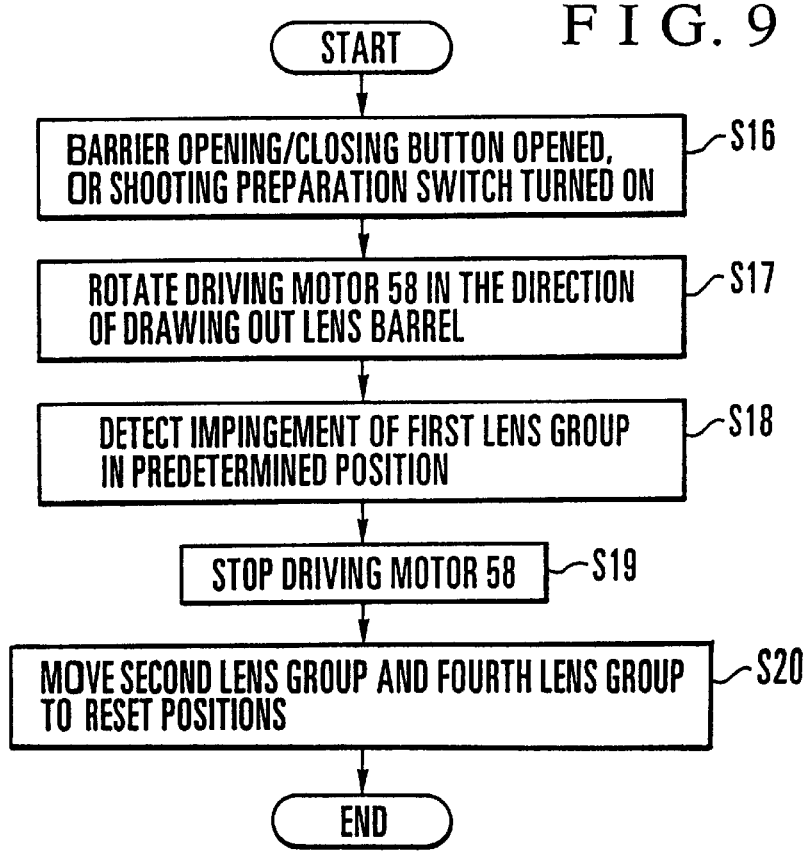
FIG. 9 is a flow chart showing another operation of the lens barrel which is the second embodiment.

A process of shifting the non-shooting state of FIG. 5 to a shooting state of FIG. 4, i.e., a process for moving the first lens group L1 along the optical axis toward the object side, is next described with reference to FIG. 9 which is a flow chart as follows:

At a step S16 of FIG. 9, with the lens barrel in the state of FIG. 5, when the shooting preparation mode switch turns on or when the photo-taking-lens barrier opening/closing button is opened, a shooting state or a shootable (ready-for-shooting) state is obtained.

At a step S17, the first lens group L1 is moved to a predetermined position on the object side by drawing out (moving toward the object side) the rack gear 55 with the driving motor 58. At a step S18, it is detected that an abutting part 47a of the first holding frame 47 has impinged on a flange 41b of the fixed member 41. It is thus detected that the first lens group L1 has been drawn out to the predetermined position. At step S19, the first lens group L1 is stopped from moving by bringing the driving motor 58 to a stop. As a result, the shooting or shootable state as shown in FIG. 4 is obtained.

At a step S20, with the shootable state thus obtained, the driving motors 54 and 46 are driven to move the second lens group L2 and the fourth lens group L4 to their initial positions. Further, in the shootable state as shown in FIG. 4, the first lens group L1 is highly accurately positioned with the abutting part 47a of the first holding frame 47 biased to the flange 41b of the fixed member 41, because the elastic members 56 and 57 which fix the rack gear 55 are deformed when the first lens group L1 is drawn out toward the object side.

In the case of an optical apparatus having a lens barrel containing a photo-taking lens in which a first lens group is arranged nearest to the object side to remain stationary when shooting is performed, the apposite arrangement of each of the first and second embodiments described above permits reduction in size. In accordance with the invention, for example, a lens barrel highly advantageous in terms of portability is obtainable for a camera-integrated type video camera or some other optical apparatuses using lens barrels of the above-stated kind.

Figure 10:
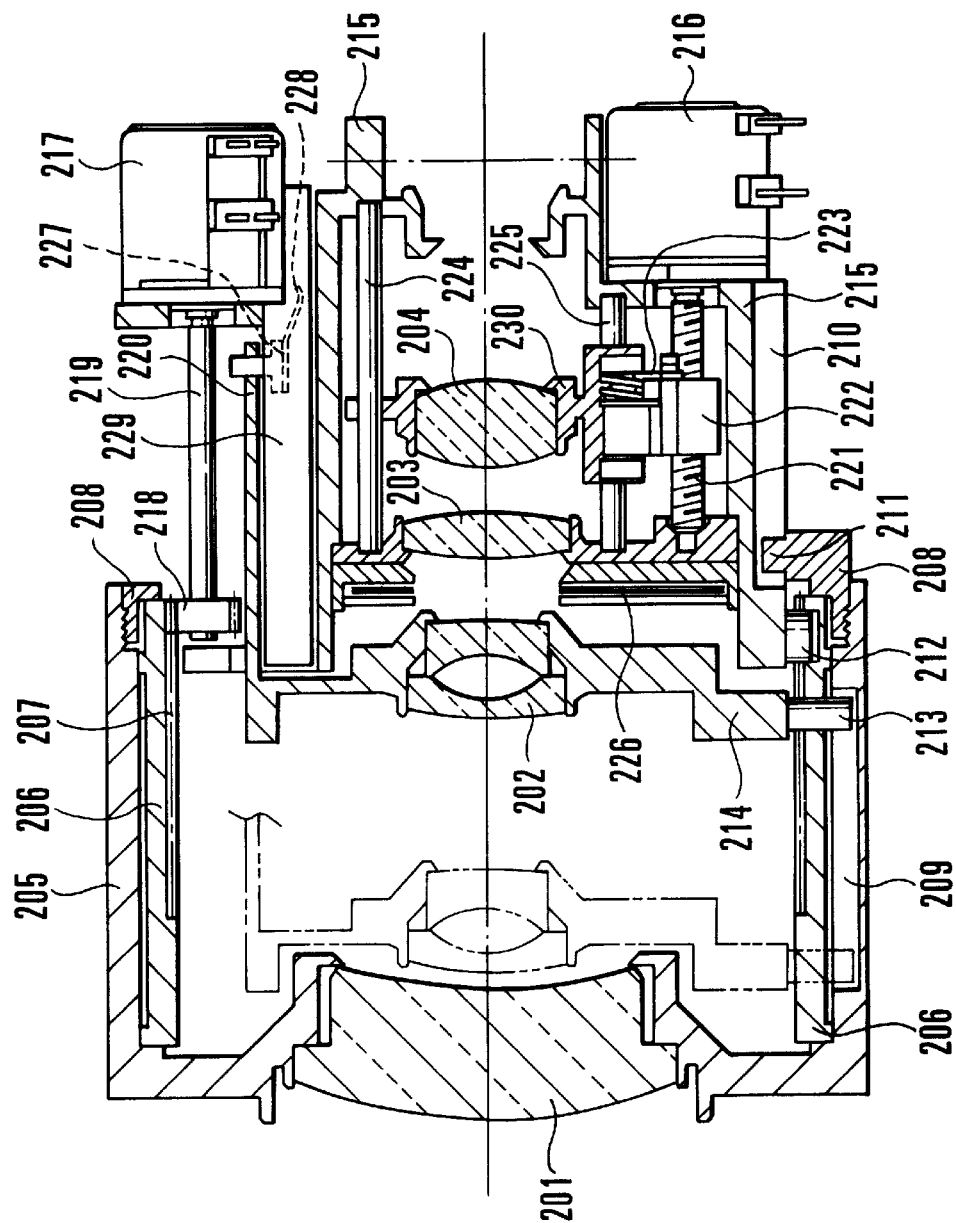
FIG. 10 is a sectional view showing the essential parts of a lens barrel which is a third embodiment of this invention as illustrated when shooting is performed.
Figure 11:
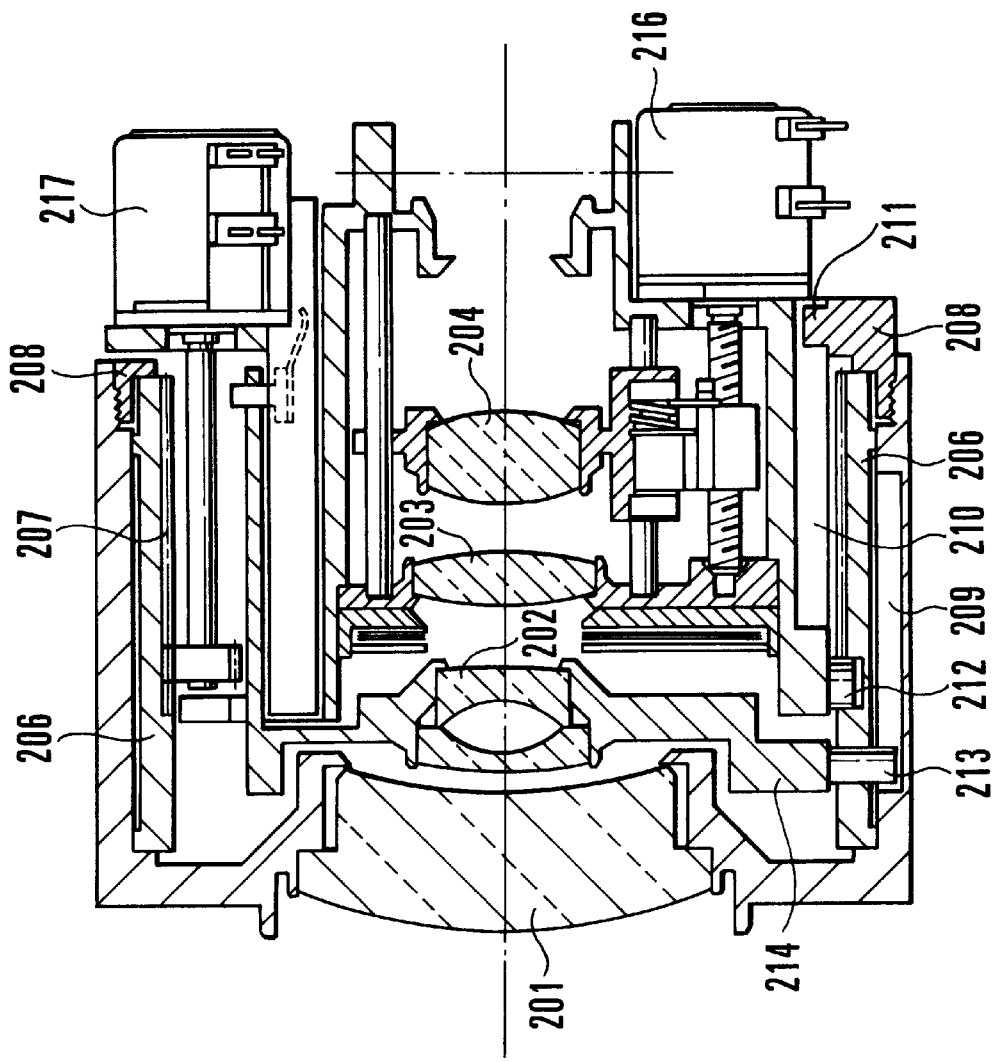
FIG. 11 is a sectional view showing the essential parts of the lens barrel which is the third embodiment as illustrated when shooting is not performed.

FIGS. 10 and 11 are sectional views showing the essential parts of a lens barrel arranged also according to this invention as the third embodiment thereof. FIG. 10 shows it as in a shootable (shooting) state and FIG. 11 as in a non-shootable, stowed state. FIGS. 12(A) to 12(D) show a portion of the third embodiment.

Referring to these figures which show the third embodiment, a first lens group 201 is arranged to remain stationary when shooting is performed, i.e., when magnifying-power-varying and focusing actions are performed or when the object of shooting is under observation. A second lens group 202 is arranged to move along an optical axis for the magnifying-power-varying action. A third lens group 203 is arranged to remain stationary when shooting is performed. A fourth lens group 204 is arranged to move along the optical axis for correcting fluctuations of an image plane resulting from the magnifying-power-varying action as well as for the focusing action.

A front lens frame (a first holding frame) 205 is arranged to hold the first lens group 201. A cam ring 206 is arranged to rotate within the front lens frame 205. A cam ring inner gear 207 is provided on the inner side of the cam ring 206. A rectilinear moving key part 211 which is provided for rectilinearly moving the front lens frame 205 is formed in one body with a frame 208 which is arranged to act as a retainer for retaining the cam ring 206 from behind in the direction of thrust. A rectilinear moving groove 209 is provided for a second lens group frame and is formed in the front lens frame 205. A rectilinear moving groove 210 for the front lens is formed in a fixed tube 215.

A stepping motor 216 is provided for driving the fourth lens group 204. A zoom motor 217 is provided for driving in retracting the lens barrel and in performing the magnifying-power-varying action. An interlock gear 218 is in mesh with the cam ring inner gear 207. A zoom motor 217 is provided with an output shaft 219 for transmitting its driving force. A fixed cam roller 212 is arranged in one body with the fixed tube 215 and engages a cam groove 232 provided in the cam ring 206.

This (third) embodiment is arranged to prevent the first lens group 201 from slanting or becoming eccentric by arranging at least three fixed cam rollers and three cam grooves at every 120 degrees as viewed from the front side of the lens barrel, although they are shown only at one place in the drawing. A second lens group cam roller 213 is arranged in one body with a second lens group moving frame (a second holding frame) 214 and engages a cam groove 231 provided in the cam ring 206. The fore end part of the second lens group cam roller 213 engages the second-lens-group rectilinear moving groove 209. Although these parts are shown only at one place, the second lens group moving frame 214 is provided with at least three second lens group cam rollers 213 and three cam grooves 232 which are arranged at every 120 degrees, as viewed from the front side of the lens barrel, for the purpose of preventing the second lens group from slanting or becoming eccentric.

An arm part 220 is formed in one body with the second lens group moving frame 214. The stepping motor 216 is provided with an output shaft 221 which has a male thread formed along its outer circumferential part. A rack member 222 is provided with a rack spring 223, which is arranged to generate a pressing force for pressing the rack teeth of the rack member 222 against the male thread part of the output shaft 221 of the stepping motor 216. The rack member 222 is attached to a fourth lens group moving frame (a fourth holding frame) 230 without any play in the direction of thrust by virtue of the pressing force. A bar 224 is provided for preventing the fourth lens group 204 from turning. A guide bar 225 is provided for moving the fourth lens group 204. These bars 224 and 225 are fitted in a sleeve formed in one body with a fourth lens group moving frame 230 to prevent the fourth lens group 204 from slanting and becoming eccentric.

A volume encoder unit 229 has a brush part 228 and a connection part 227 which is formed in one body with the brush part 228. These parts are connected to the arm part 220 of the second lens group moving frame 214. When the brush part 228 moves to the right or left as viewed on the drawing, a contact position on a resistance body (not shown) varies. Then, the output value of the encoder unit 229 varies with the contact position to permit detection of the position of the second lens group 202 in the direction of the optical axis. Reference numeral 226 denotes an iris part.

In the third embodiment thus arranged, when shooting is performed, with the second lens group moving frame 214 in a position indicated by a full line (a telephoto-end position) as shown in FIG. 10, as the zoom motor 217 rotates in a predetermined direction, a power is transmitted to the cam ring inner gear part 207 via the output shaft 219 and the interlock gear 218 to cause the cam ring 206 to rotate in a predetermined direction. In this instance, the fixed cam roller 212 is located in an area 232b of the cam groove 232 where the cam groove 232 has no cam lift ("0" cam lift position) as shown in FIG. 12(D). Therefore, the rotation of the cam ring 206 does not cause the first lens group 201 to move along the optical axis.

Meanwhile, the second lens group cam roller 213, on the other hand, is located in an area 231a where the cam groove 231 on the cam ring 206 has a cam lift. Therefore, the second lens group 202 moves along the optical axis, accordingly as the cam ring 206 rotates, to come to a position indicated by a two-dot chain line (to a wide-angle end position), as shown in FIG. 12(C). At this time, the position of the second lens group 202 in the direction of the optical axis is detected by the volume encoder unit 229. The cam ring 206 rotates in a state of having its fitting play effectively suppressed not to exceed a predetermined amount both in thrust and radial directions by the front lens frame 205 and the frame 208.

In this instance, the rectilinear moving key 21 and the rectilinear moving groove 210 for the front lens frame 205 engage each other in such a way as to prevent the first lens group 201 from turning and to remain stationary. The second lens group cam roller 213 and the rectilinear moving groove 209 for the second lens group 202 engage each other to allow the second lens group moving frame 214 to move straight without turning.

FIG. 11 shows the lens barrel as in a stowed state (or a non-shooting state) obtained with the first lens group 201 retracted by rotating the zoom motor 217 further in the predetermined direction from its position obtained when the second lens group moving frame 214 is in the position indicated by a two-dot chain line in FIG. 10. At this time, the relation between the fixed cam roller 212 and the second lens group cam roller 213 on the cam ring 206 changes from a state shown in FIG. 12(C) to a state shown in FIG. 12(B) and further to a state shown in FIG. 12(A) one after another.

Figure 12A:
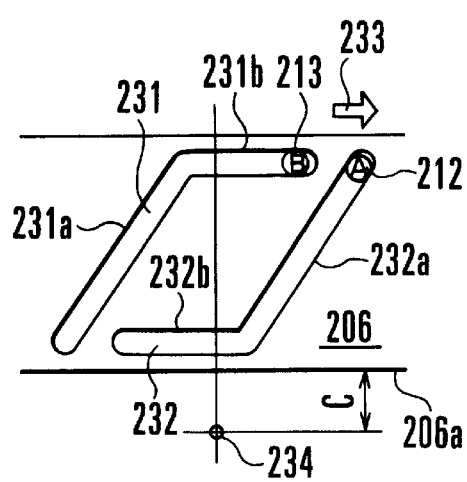
FIGS. 12(A) to 12(D) are development views showing the cam mechanism of a cam ring shown in FIG. 10.
Figure 12B:
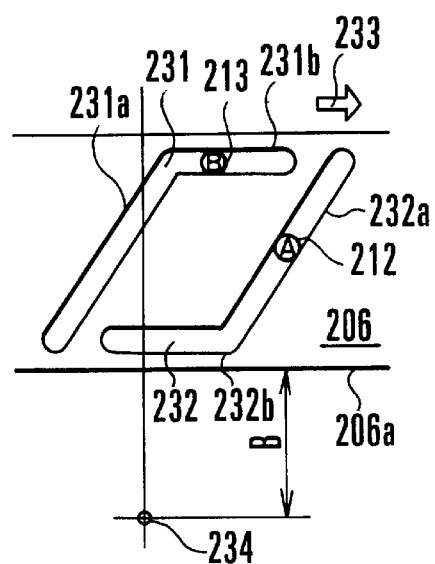
Figure 12C:
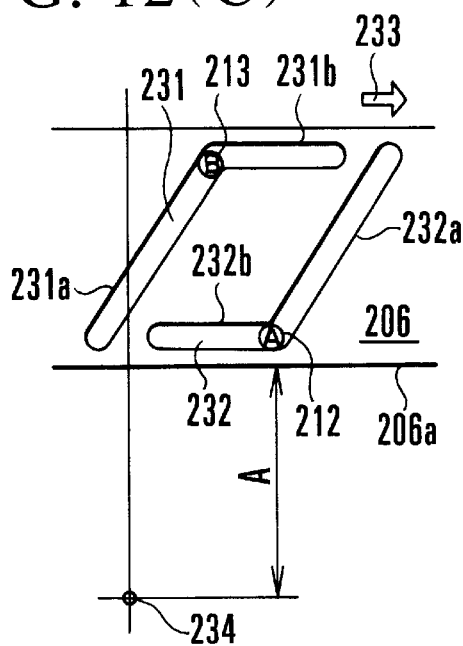
Figure 12D:
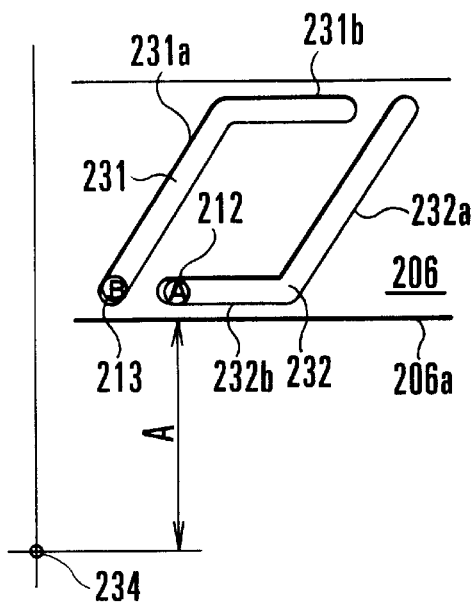

In the case of this embodiment, the second lens group cam roller 213 for the second lens group moving frame 214 is caused to move in an area 231b where the cam lift is zero, as shown in FIGS. 12(C), 12(B) and 12(A), during the process of the shift from the shooting state of FIG. 10 to the non-shooting state of FIG. 11. This makes the relative positions of the first and second lens groups 201 and 202 unvarying. Then, the lens barrel is retracted with the front lens frame 205 caused to rectilinearly move by rotating the cam ring 206 to a position where the cam groove 232 engaging the fixed cam roller 212 has a predetermined cam lift. As a result, the lens barrel is brought into the stowed state of FIG. 11.

The cam mechanism of the cam ring 206 is next described with reference to FIGS. 12(A) to 12(D) as follows: In each of these figures, angles of rotation of the cam ring are shown in the transverse direction of the drawing while positions in the direction of the optical axis are shown in the vertical direction of the drawing. While each of the first and second lens groups 201 and 202 is positioned actually by using at least three cam parts for the purpose of preventing them from slanting or from becoming eccentric, as mentioned above, only one cam part is shown in these drawings for simplification.

FIG. 12(A) shows a stowed state corresponding to FIG. 11. FIG. 12(B) shows an intermediate state obtained during the process of shifting the first and second lens groups 201 and 202 from the stowed state to the shooting (or shootable) state. FIG. 12(C) shows a state obtained when the focal length of the photo-taking lens is at a wide-angle end, corresponding to a part indicated by a two-dot chain line in FIG. 10. FIG. 12(D) shows a state obtained when the focal length position of the photo-taking lens is at a telephoto end, corresponding to full lines in FIG. 10. An intermediate focal length is obtained in a state between the states shown in FIGS. 12(C) and 12(D).

In FIGS. 12(A) to 12(D), reference numeral 234 denotes the position of the optical axis obtained, for example, on a focal plane. Reference symbol A denotes the fixed cam roller (follower) 212. Reference symbol B denotes the second lens group cam roller (follower) 213. Since the fixed cam roller 212 and the second lens group cam roller 213 engage the rectilinear moving key 211 and the rectilinear moving groove 209 for the second lens group 202 as mentioned above, their positions (relative distance) in the transverse direction from the optical axis as viewed on the paper of FIGS. 12(A) to 12(D) remain unchanged.

The cam ring 206 is provided with the cam groove 232 for the front lens frame 205 and the cam groove 231 for the second lens group moving frame 214. Each of these cam grooves has a flat part ("0" cam lift part) 231b or 232b where the cam lift is zero and a cam lift part (slanting cam part) 231a or 232a where a cam lift is provided.

In the stowed state as shown in FIG. 12(A), a distance C from the focal plane 234 to the rear end part 206a of the cam ring 206 is the shortest. Then, since the second lens group cam roller 213 is located rearmost in the flat (no-cam-lift) part 231b, the rotation of the cam ring 206 from this state in the direction of arrow 233 makes no difference in the relative positions of the cam ring 206 and the second lens group 202, that is, the relative positions of the first and second lens groups 201 and 202 also remain unchanged.

Meanwhile, since the fixed cam roller 212 is then located rearmost in the cam-lift part 232a, the front lens frame 205 is drawn out when the cam ring 206 rotates in the direction of arrow 233, i.e., the first and second lens groups 201 and 202 are drawn out together.

In the state shown in FIG. 12(B), the photo-taking lens is in an intermediate stage of a drawing-out process. The distance between the focal plane 234 and the rear end part 206a of the cam ring 206 becomes a distance B which is larger than the distance C. This state shifts to the state of FIG. 12(C) when the cam ring 206 rotates further in the direction of arrow 233. In the state of FIG. 12(C), the fixed cam roller 212 enters the flat part 232b while the second lens group cam roller 213 comes to the entrance of the slanting cam part 231a which has a cam lift. At this time, the distance between the focal plane 234 and the rear end part 206a of the cam ring 206 becomes a distance A which is larger than the distance B. This state corresponds to the state indicated by the two-dot chain line in FIG. 10. When the cam ring 206 rotates further in the direction of arrow 233 from this state, the telephoto-end state of FIG. 12(D) is obtained.

As described above, the third embodiment is arranged such that the first lens group 201 which remains stationary in varying the magnifying power when shooting is performed is retracted by means of the single cam ring 206 and the single motor 217.

Further, in the case of the third embodiment, the first lens group 201 is retracted, with the relative positions of the first lens group 201 and the second lens group 202 kept unvaried when the second lens group 202 is located at the wide-angle end, to an extent which is the same as the stroke of motion made by the second lens group 202 in performing the magnifying-power-varying action.

For reduction in size, lens barrels are designed in general to have a minimum distance between the first and second lens groups 201 and 202 within a range in which they never come to mechanically collide with each other when they are located at the wide-angle end positions. A distance between the iris part 226 and the second lens group 202 at the telephoto end is also minimized.

In the case of this (third) embodiment, the moving amount of the second lens group 202 for the magnifying-power-varying action and the moving amount for retracting to a stowing position are arranged to coincide with each other to attain the highest lens barrel retracting effect. For this purpose, in the cam mechanism shown in FIGS. 12(A) to 12(D), the amount of cam lift of the cam groove 231 is arranged to be equal to that of the cam groove 232.

FIGS. 13(A), 13(C), and 13(D) show the moving loci in the direction of the optical axis of the first, second, third and fourth lens groups which constitute a zoom lens. The positions of these lens groups shown in FIGS. 13(A), 13(C), and 13(D) correspond respectively to FIGS. 12(A), 12(C) and 12(D).

A fourth embodiment of this invention is next described as follows: In this case, this invention is applied to a rear-focus type zoom lens. The zoom lens as a whole consists of four lens groups in the same manner as the zoom lens of the third embodiment. It, however, differs in that the first lens group is arranged to be moved toward the object side in performing a magnifying-power-varying action by shifting the focal length from a wide-angle end position to a telephoto end position.

FIGS. 14(A), 14(C), and 14(D) show the positions on the optical axis of the lens groups constituting the zoom lens of the fourth embodiment in the same manner as FIGS. 13(A), 13(C), and 13(D).

FIGS. 15(A) to 15(D) show in development views the states of the cam mechanism of the cam ring 206 of the fourth embodiment in the same manner as the cam mechanism shown in FIGS. 12(A) to 12(D).

Figure 15A:
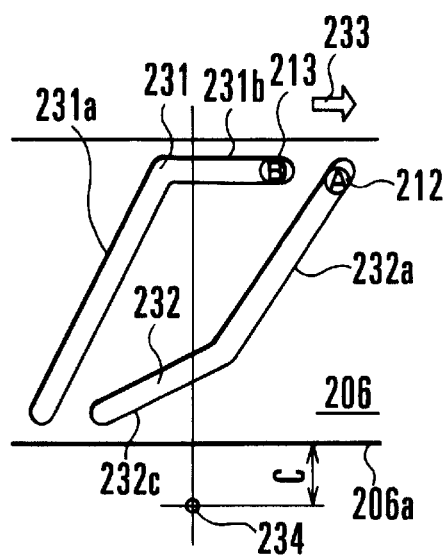
FIGS. 15(A) to 15(D) are development views of the cam mechanism of a cam ring of the fourth embodiment.
Figure 15B:
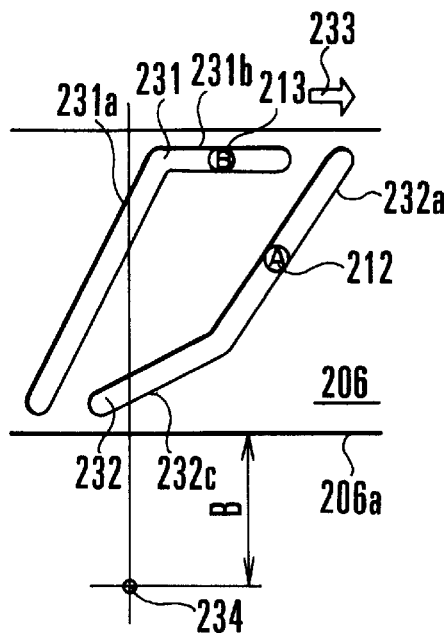
Figure 15C:
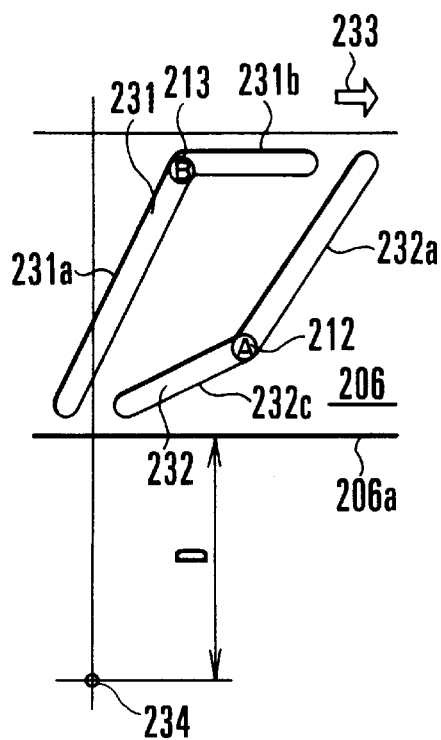
Figure 15D:
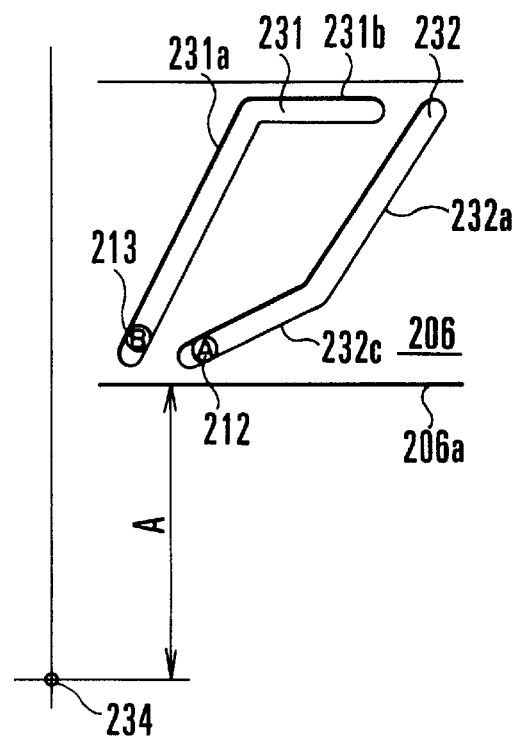

FIG. 14(A) shows the zoom lens as in a stowed (retracted) state. FIG. 14(C) shows a state obtained at the wide-angle end of the zoom lens. FIG. 14(D) shows a state obtained at the telephoto end of the zoom lens. FIG. 15(A) shows the stowing state corresponding to the FIG. 14(A). FIG. 15(B) shows an intermediate state obtained during the process of shift from the stowed state to a shooting state. FIG. 15(C) shows a wide-angle end state which corresponds to FIG. 14(C). FIG. 15(D) shows a telephoto-end state which corresponds to FIG. 14(D).

The fourth embodiment differs from FIGS. 12(A) to 12(D) in that the cam groove 232 of the front lens frame 205 is arranged to have no zero-cam-lift area by replacing it with an area 232c which has a predetermined cam lift. The change from the third embodiment enables the first lens group 201 to move in the direction of an optical axis even when the magnifying-power-varying action is in process. The motion of the second lens group 202, in this case, corresponds to a difference between the lift of the cam groove 231 in the area 231a of FIGS. 12(C) and 12(D) and that of the cam groove 232.

A fifth embodiment of this invention is next described as follows: In each of the third and fourth embodiments, the cam groove 232 for the front lens frame 205 and the cam groove 231 for the second lens moving frame 214 are separately provided in the cam ring 206.

In the case of the fifth embodiment, on the other hand, the positions in the direction of an optical axis of first and second lens groups 201 and 202 are controlled by one common cam groove including the two cam grooves.

Figure 16A:
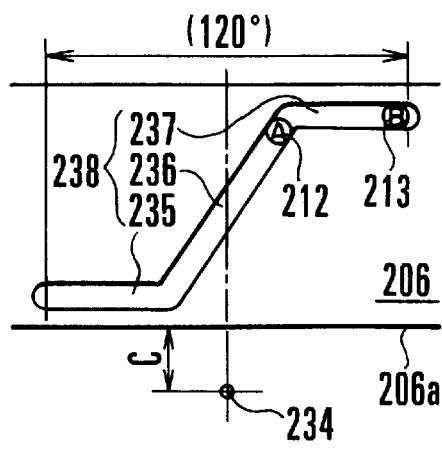
FIGS. 16(A) to 16(D) are development views of the cam mechanism of a cam ring which relates to a fifth embodiment of this invention.
Figure 16B:
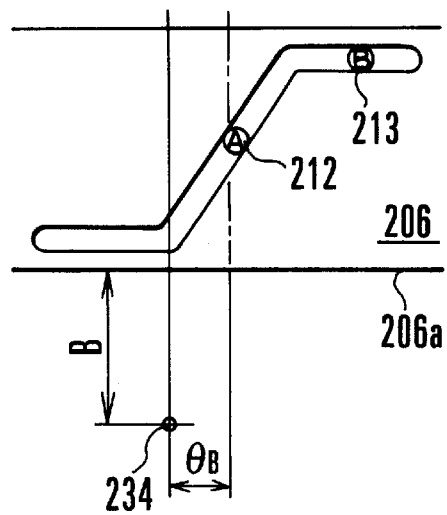
Figure 16C:
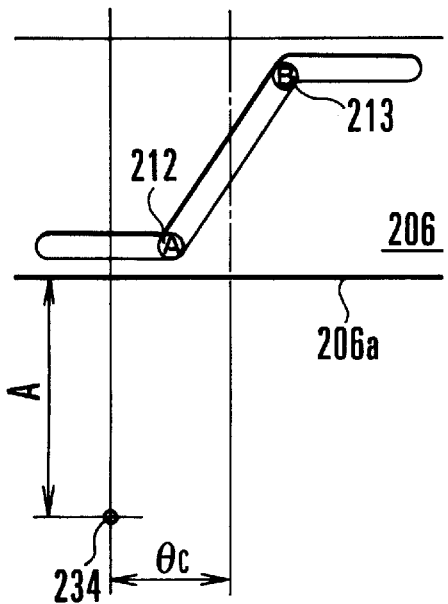
Figure 16D:
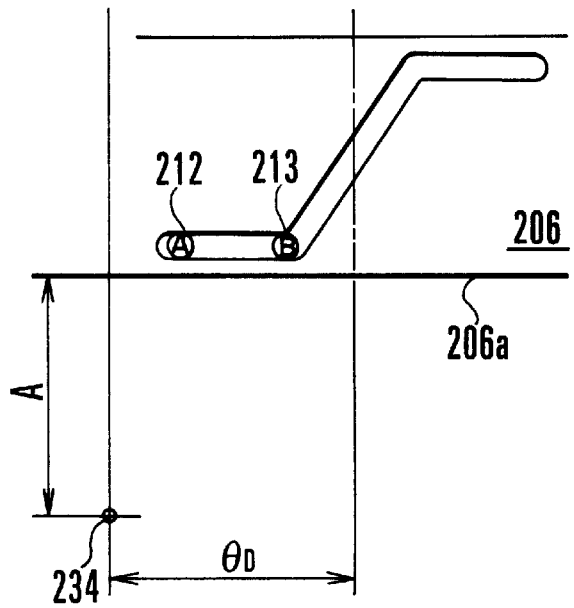

FIGS. 16(A) to 16(D) are development views of the cam mechanism of a cam groove 238 provided in a cam ring 206 for a zoom lens which is similar to that of the third embodiment. FIG. 16(A) shows the cam mechanism as in a state obtained when the zoom lens is in a stowed state. FIG. 16(B) shows the cam mechanism as an intermediate state obtained when the zoom lens is in process of a shift from the stowed state to a shooting (shootable) state. FIG. 16(C) shows the cam mechanism as in a state obtained when the zoom lens is in a wide-angle end position. FIG. 16(D) shows the cam mechanism as in a state obtained when the zoom lens is in a telephoto end position.

The cam groove 238 includes a cam part (a first area) 235 which has zero (0) cam lift, a cam part (a third area) 237 which also have zero cam lift and a cam part (a second area) 236 which is arranged to be used in common for first and second lens groups 201 and 202 and has the cam parts 235 and 237 extending from both ends thereof. The cam part 235 is an area arranged to be singly used for controlling the position of a front lens frame 205 and the cam part 237 is an area to be singly used for controlling the position of a second lens group moving frame 214. If the cam part 235 is arranged to have a cam lift, the zoom lens can be arranged in the same manner as the zoom lens of the fourth embodiment shown in FIG. 14.

As mentioned in the foregoing, at least three common cam grooves are arranged to prevent the moving lens groups from slanting or becoming eccentric. In the case of FIGS. 16(A) to 16(D), for example, the cam groove is formed over a range of 120 degrees. The angles of rotation of the cam ring 206 from the state of FIG. 16(A) to the state of FIG. 16(B), to the state of FIG. 16(C) and to the state of FIG. 16(D) are respectively expressed as θB, θC and θD. A distance between the focal plane 234 and the rear end part 206a of the cam ring 206 changes from a distance C shown in FIG. 16(A) to distances B and A shown in FIG. 16(B) to 16(D) one after another. A distance obtained by subtracting the distance C from the distance A represents an extent to which the zoom lens is retracted. The arrangement of combining different cam grooves into one cam groove in the above-stated manner effectively contributes to simplification of machining work, improvement in strength and improvement in cam precision resulting from the improved strength.

Figure 17A:
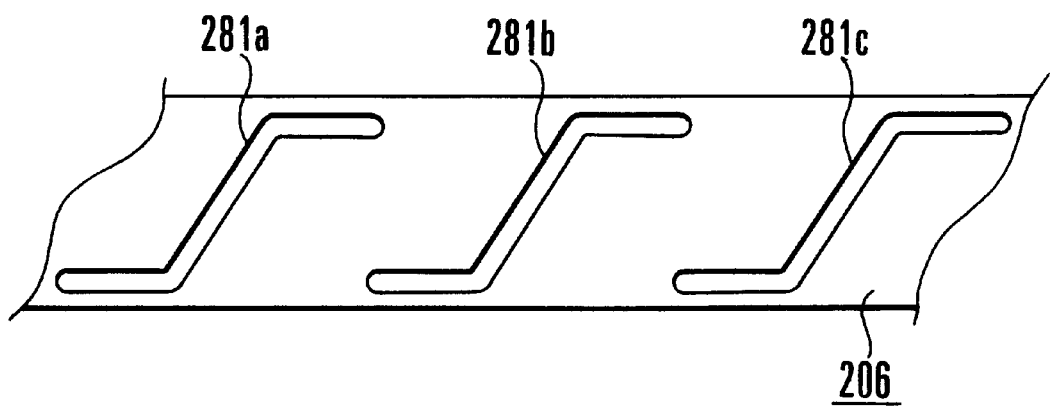
FIGS. 17(A) and 17(B) are development views showing by way of example the cam mechanism of a cam ring arranged according to this invention.
Figure 17B:
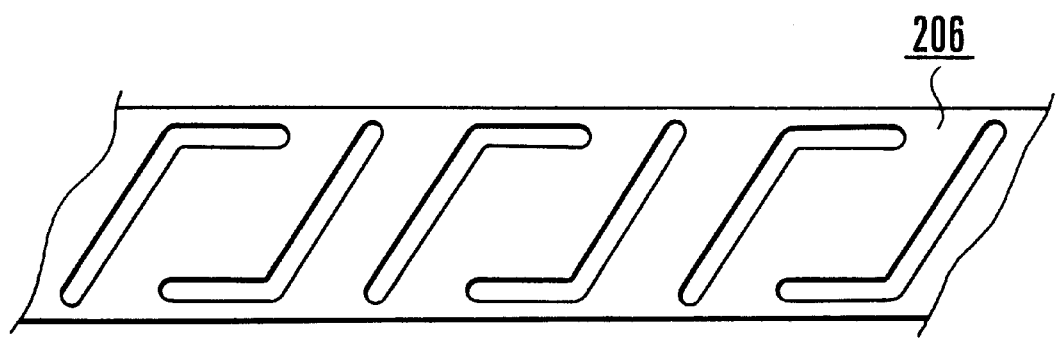

FIGS. 17(A) and 17(B) are development views of the cam mechanism of cam parts provided in the cam ring 206. FIGS. 17(A) and 17(B) show the cam ring 206 in a state of being developed 360 degrees in cases where the cam ring 206 is arranged to position one movable lens group by using three cam parts 281a, 281b and 281c. FIG. 17(A) shows a cam ring arrangement which applies to the fifth embodiment of this invention. FIG. 17(B) shows a cam ring arrangement applicable to the third embodiment of the invention. In the case of FIG. 17(A), the cam ring 206 is allowed to have only three cam parts. Therefore, the arrangement makes a machining process simpler than the arrangement shown in FIG. 17(B) and also allows the cam ring 206 to have a greater strength than the cam ring of FIG. 17(B) as it has a larger excess area than the latter.

Further, the cam ring of FIG. 17(A) can be formed to have a more moderate cam lift rise (cam inclination) than the cam ring of FIG. 17(B). Therefore, for example, the highest speed of a focusing lens group necessary in zooming can be adequately suppressed by moderating the cam inclination in an area near the telephoto end position where the focusing lens must be moved at a high speed.

While the third, fourth and fifth embodiments described above are arranged to shorten the total length of the lens from the length in the shooting state to the length in the stowed state (non-shooting state) between the first lens group and the second lens group which are located first and second on the object side, this invention is not limited to this arrangement. For example, the zoom lens shown in FIG. 13 may be modified to have a double structure by applying and carrying out the invented arrangement between the third lens group located third from the object side and the fourth lens group located fourth from the object side as well as between the first and second lens groups located first and second.

Such modification permits the reduction of the total length of the lens in the stowed state to a greater extent. Further, even if the structural arrangement of this invention is not applied for reduction in total lens length, the lens groups can be biased to a predetermined part according to this invention, so that a wider space can be secured within the body of an optical apparatus according to this invention. The space thus secured may be used for retracting a movable part, for example, under a condition peculiar to a non-shooting state.

In each of the embodiments described, the cam parts are arranged to include cams formed as cam slots or cam grooves in a cam tube or a cylindrical tube and cam rollers which are fitted in the cam slot or cam grooves to act in an interlocked manner. This arrangement may be changed to provide cam parts 238 on the inner side of a cam tube 206 in the form of a protruding cams as shown in FIGS. 18(A) and 18(B).

Figure 18A:
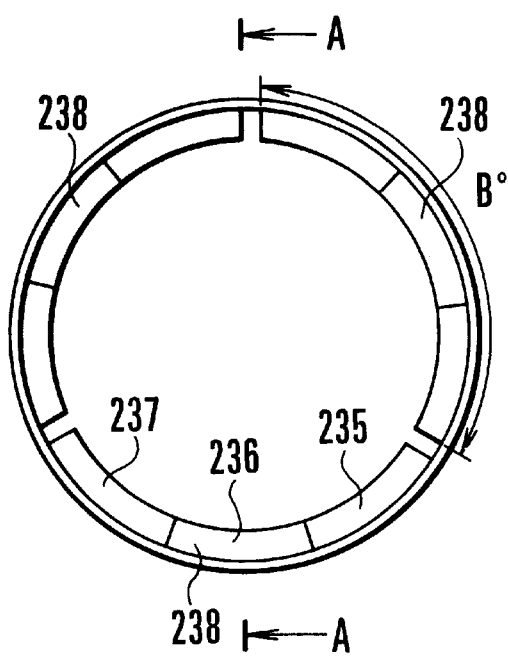
FIGS. 18(A) and 18(B) show another example of a cam ring arranged according to this invention.
Figure 18B:
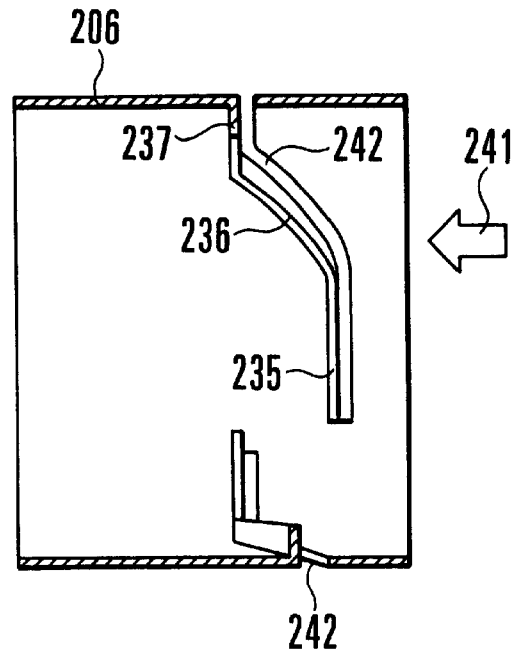

As shown in FIG. 18(A), each cam part 238 is formed within a range of B° to include zero-cam-lift parts 235 and 237 which have no cam lift and a cam-lift part 236 which has a cam lift. The cam parts 238 which are arranged in this manner are provided, for example, in three parts along the whole circumference of the cam tube 206. The second lens group moving frame 214 which is not shown has three cam follower parts arranged, for example, to be pressed against these cam parts 238 in the direction of arrow 241 as shown in FIG. 18(B) by a pressing force of a spring or the like. The cam followers may be arranged to sandwich the protruding cam parts 238 in between them. Further, for connection with the rectilinear moving groove 209 shown in FIG. 10, a connecting groove part 242 is provided along with each of the protruding cam parts 238.

Further, in a case where deterioration in image forming efficiency such as a one-side blur results from an excessive slant of the front lens frame 205 or the like caused by the play of it taking place in the shooting state as shown in FIG. 10, the front lens frame 205 may be provided with an additional fixed holding tube by fitting it on the outer circumferential part of the front lens frame 205 to hold it from outside.

Figure 19:
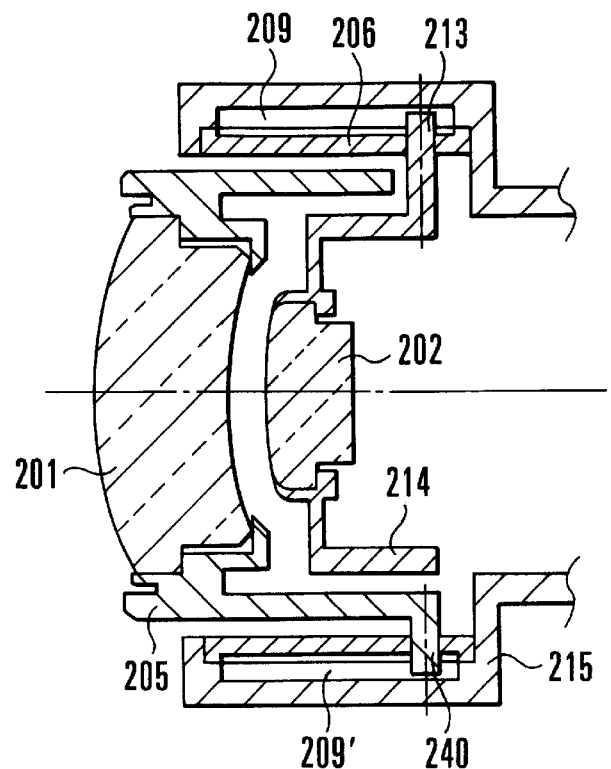
FIG. 19 is a sectional view showing a further example of a cam ring arranged according to this invention.
Figure 20:
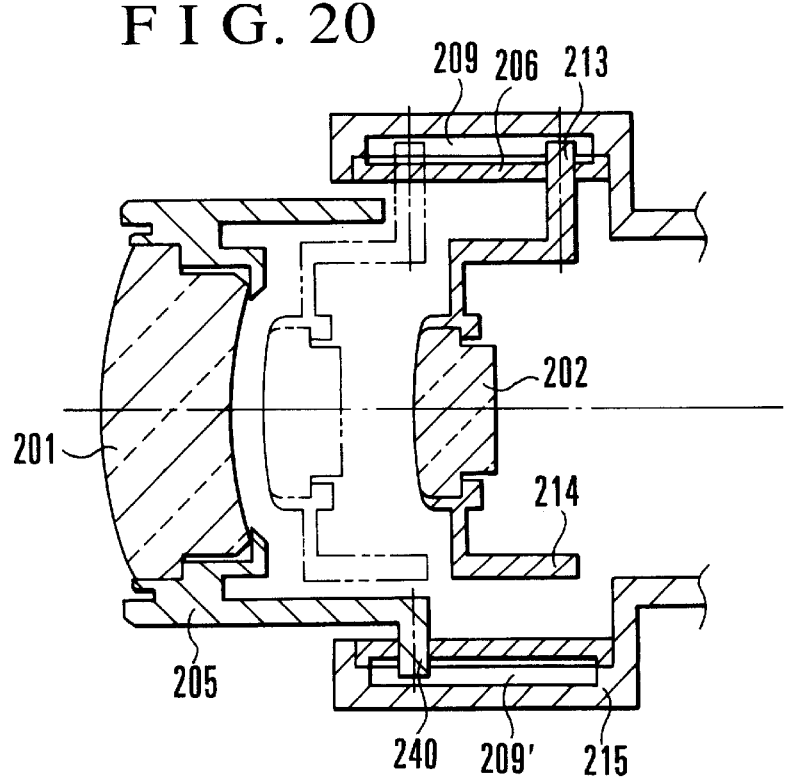
FIG. 20 is a sectional view showing a further example of a cam ring arranged according to this invention.

As shown in FIGS. 10 and 11, the position of the fixed cam roller 212 in the direction of the optical axis is unvarying. This arrangement may be changed as shown in FIGS. 19 and 20. In the case of FIGS. 19 and 20, the cam ring 206 is arranged to be rotatively drawn outward together with the front lens frame 205.

Referring to FIGS. 19 and 20, the cam ring 206 which is indicated by hatching is secured to a fixed tube 215 which is stationary in the direction of thrust. The cam ring 206 is thus stationary in the direction of thrust but is arranged to be rotatable. An inner gear part which is not shown is provided on the inner side of the cam ring 206 for allowing the cam ring 206 to be rotated by a motor like in the case of FIGS. 10 and 11.

Cam grooves are formed in the cam ring 206 like in the cases of FIGS. 17(A) and 17(B). The second lens group moving frame 214 is provided with a cam roller 213 like in the case of FIGS. 10 and 11. The cam roller 213 is fitted in the cam groove of the cam ring 206 and is also fitted, at its fore end, into a rectilinear moving groove 209 provided in the fixed tube 215. The second lens group moving frame 214 is thus arranged to be movable in the direction of the optical axis, in the same manner as in the case of FIGS. 10 and 11, by the rotation of the cam ring 206 through the cam part 236 having a cam lift. A cam roller part 240 is formed in one body with the front lens frame 205. The cam roller part 240 is fitted into the cam groove of the cam ring 206 and is also fitted, at its fore end, into a rectilinear moving groove 209' provided in the fixed tube 215.

While the cam ring and the front lens frame are arranged to be in one body in the direction of thrust by arranging the cam roller on the fixed side and the cam groove (cam ring) on the side movable in the direction of thrust in the case of FIGS. 10 and 11, the cam ring is arranged on the fixed side and the cam roller on the side movable in the direction of thrust in the arrangement shown in FIG. 20. Therefore, the cam ring and the fixed tube are arranged to be in one body in the direction of thrust also in the case of FIG. 20.

Figure 21:
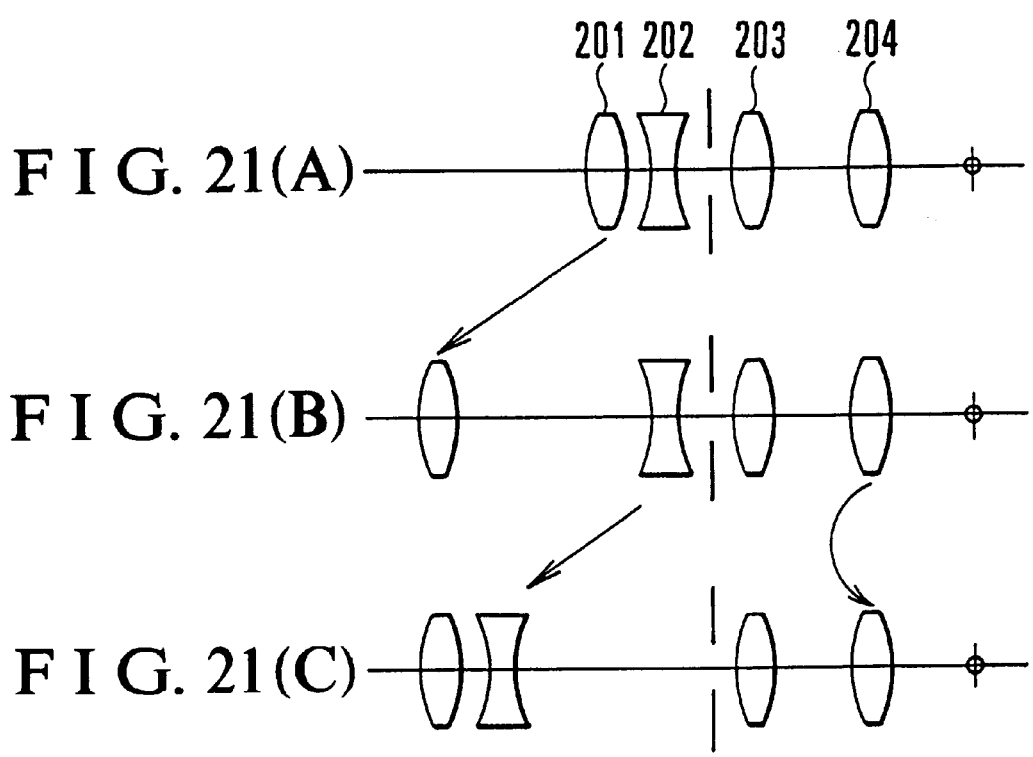

FIG. 19 shows the lens as in a stowed state. In this state, each lens group is located on the side of the camera body as shown in FIG. 21(A). When the cam ring 206 rotates from this state, the front lens frame 205 moves forward while the second lens moving frame 214 remains in its position. A shooting state at the telephoto end is thus obtained, as shown in FIG. 21(C). When the cam ring 206 rotates further from its position of this state, the second lens group 202 moves forward to perform the magnifying-power-varying action to vary a magnifying power obtained at the telephoto end to a magnifying power obtained at the wide-angle end. The state of the wide-angle end thus obtained is as shown in FIG. 21(D).

While each of embodiments has been described mainly through the arrangement of the cam ring. The same advantageous effect can be attained by replacing the cam ring with a cam plate which is arranged to be in a form obtained by developing the cam ring and to be slidable right and left.

An optical apparatus on which a lens barrel containing therein a photo-taking lens of the kind having a first lens group located nearest to the object side to be stationary or to be movable when shooting is performed is mounted can be arranged according to this invention to permit reduction in size of the whole optical apparatus when shooting is not performed by appositely arranging the lens barrel as described in the foregoing. This invention, therefore, provides a lens barrel which is arranged to improve the portability of, for example, a camera-integrated type video camera or an optical apparatus using the lens barrel.

In particular, according to this invention, since the lens barrel which holds the lens group located nearest to the object side is appositely arranged to have a retractable structure, it is possible to attain a lens barrel having the total length shortened when shooting is not performed and an optical apparatus using the lens barrel.

Figure 22:
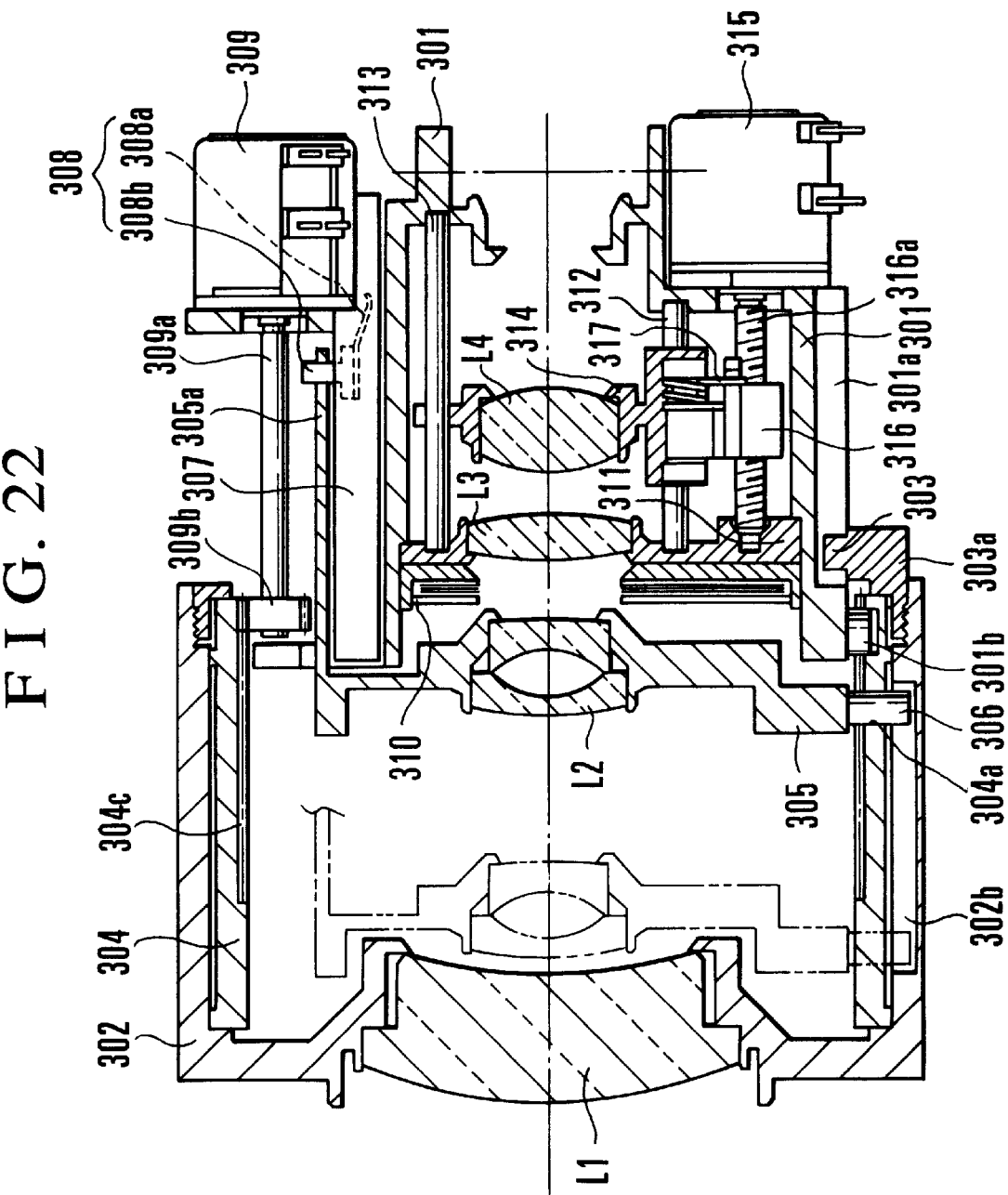
FIG. 22 is a sectional view showing the essential parts of a lens barrel which is a sixth embodiment of this invention as illustrated when shooting is performed.
Figure 23:
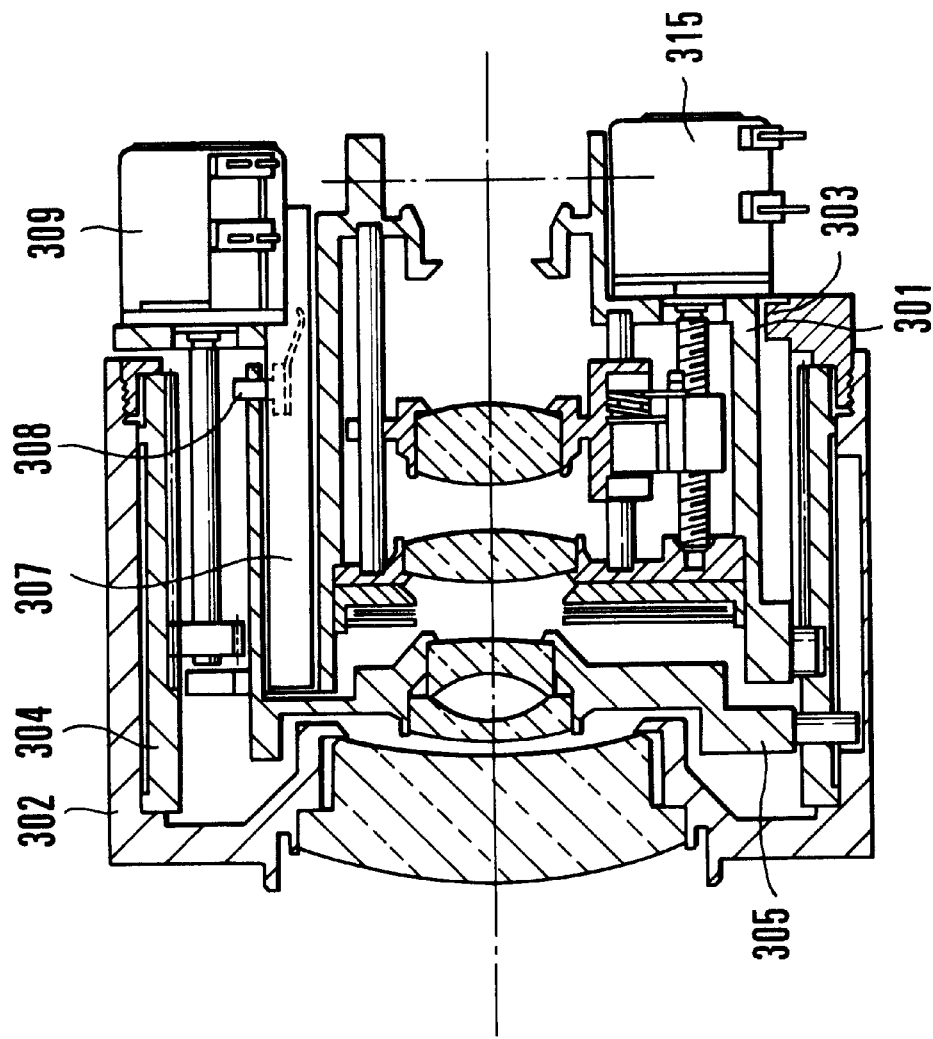
FIG. 23 is a sectional view showing the essential parts of the lens barrel which is the sixth embodiment as illustrated when shooting is not performed.
Figure 24:
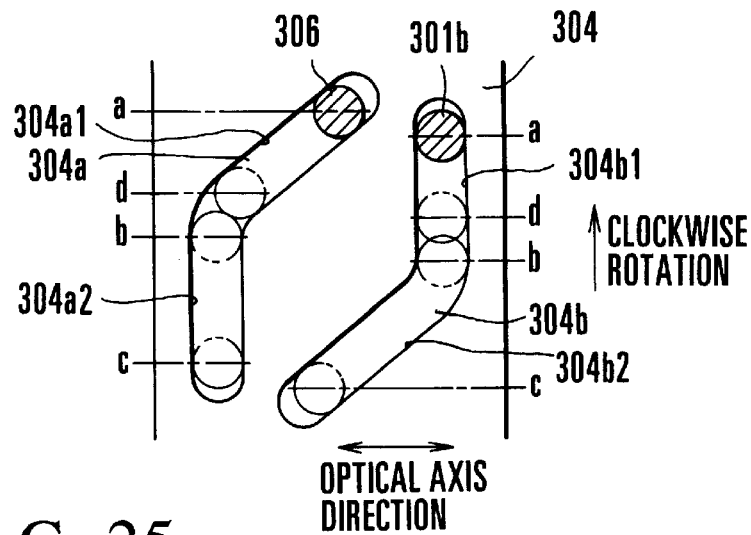
FIG. 24 is a development view showing the cam mechanism of a cam ring shown in FIG. 22.
Figure 25:
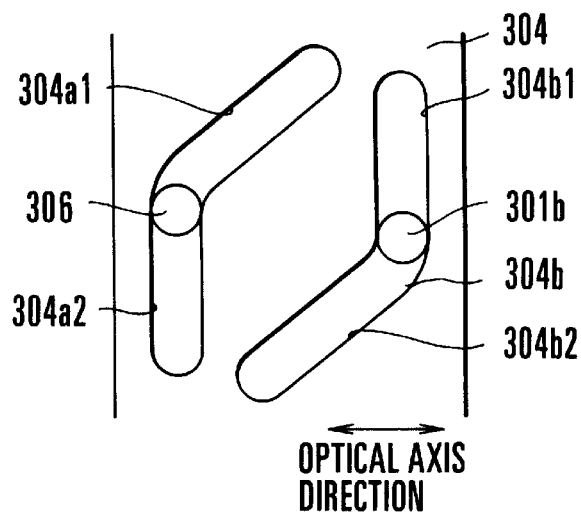
FIG. 25 is a development view showing the cam mechanism of the cam ring of FIG. 22.
Figure 26:
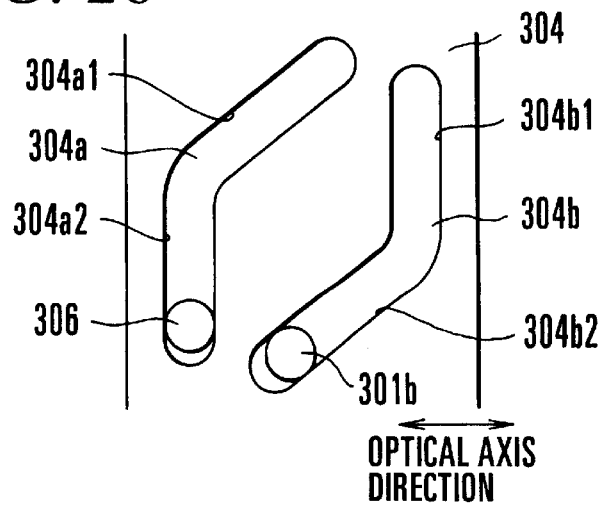
FIG. 26 is a development view also showing the cam mechanism of the cam ring of FIG. 22.

FIGS. 22 and 23 are sectional views showing the essential parts of a lens barrel which is arranged as a sixth embodiment of this invention. FIG. 22 shows the lens barrel as in a shooting state and FIG. 23 as in a non-shooting (stowed) state. FIGS. 24 to 26 show a part of the lens barrel of FIG. 22.

Referring to the above-stated drawings, a first lens group L1 is arranged to remain stationary when shooting is performed (in performing magnifying-power-varying actions and in observing the object of shooting). A second lens group L2 is arranged to move along an optical axis in varying a magnifying power. A third lens group L3 is arranged to be stationary when shooting is performed. A fourth lens group L4 is arranged to move along the optical axis in correcting the fluctuations of an image plane resulting from the magnifying-power-varying action as well as in focusing.

A fixed tube 301 is secured to a camera body which is not shown. A front lens frame 302 (first holding frame) holds the first lens group L1. A cam ring 304 is fitted in the front lens frame 302 and is sandwiched in between the front lens frame 302 and a rectilinear moving key part 303 for the front lens frame 302 and is cam-restricted by a fixed cam roller 301b. A cam ring inner gear 304c is arranged on the inner side of the cam ring 304. The rectilinear moving key part 303 for the front lens frame 302 is arranged in one body with a frame 303a which acts to retain from behind the cam ring 304 in the direction of thrust. A rectilinear moving groove 302b is provided for a second lens group moving frame 305 and is formed in the inner side of the front lens frame 302. A rectilinear moving groove 301a is provided for the front lens frame 302 and is formed in the fixed tube 301.

A stepping motor 315 is arranged to drive the fourth lens group L4. A zoom motor 309 is arranged to perform a driving action in retracting the lens barrel and in performing the magnifying-power-varying action. The zoom motor 309 is attached to the fixed tube 301 and is connected to the cam ring inner gear 304c. An interlock gear 309b is in mesh with the cam ring inner gear 304c. An output shaft 309a is arranged to transmit a driving force of the zoom motor 309. A fixed cam roller 301b is formed in one body with the fixed tube 301 and engages a lens barrel retracting cam groove 304b which is provided in the cam ring 304.

A front view of the lens barrel of the sixth embodiment would show three fixed cam rollers and three cam grooves arranged at every 120 degrees for preventing the first lens group L1 from slanting or becoming eccentric. However, for the same of simplification, the sectional views FIG. 22 and 23 show only one of the fixed cam rollers and only one of the cam grooves.

A second lens group cam roller 306 is arranged in one body with the second lens group moving frame 305 to engage a cam slot formed in the cam ring 304 and also to engage, at its fore end part, a rectilinear moving groove 302b provided for the second lens group moving frame 305. The second lens group moving frame 305 which holds the second lens group L2 has the cam roller 306. The second lens group cam roller 306 is fitted in the second lens group rectilinear moving groove 302b formed in the inner side of the front lens frame 302 and is also fitted in the second lens group cam 304a formed in the cam ring 304.

The embodiment has three second lens group cam rollers 306 and three cam grooves arranged at every 120 degrees for the purpose of preventing the second lens group L2 from slanting or becoming eccentric. However, in the sectional views FIG. 22 and 23, only one of the cam rollers and only one of the cams groove are shown.

An arm part 305a is formed in one body with the second lens group moving frame 305. The stepping motor 315 has an output shaft 316a which is provided with a male thread on the outer circumferential part thereof. A rack member 316 is provided with a spring 317, which is arranged to generate a pressing force which presses the rack teeth of the rack member 316 against the male thread part of the output shaft 316a. The rack member 316 is attached to a fourth lens group moving frame 314 (fourth holding frame) with no play in the direction of thrust. A bar 313 is arranged to prevent the fourth lens group L4 from turning around. A guide bar 312 which is provided for moving the fourth lens group L4 is fitted in a sleeve which is formed in one body with the fourth lens group moving frame 314. These parts are thus arranged to prevent the fourth lens group L4 from slanting or from becoming eccentric. A third lens group holding frame 311 holds the third lens group L3 and is attached to the fixed tube 301.

An encoder unit 307 (position detecting means or an encoder) is provided for detecting the magnifying-power-varying position of the second lens group moving frame 305 and a retracted position. The encoder unit 307 has a brush part 308a and a connection part 308b which is formed in one body with the brush part 308a. These parts are connected to the arm part 305a. An encoder slider 308 is formed jointly by the brush part 308a and the connection part 308b. When the brush part 308a moves to the right or left as viewed on the drawing, its contact position on a resistance body (not shown) varies. Then the output value of the encoder unit 307 varies with the contact position to permit detection of the position of the second lens group L2 in the direction of the optical axis. Reference numeral 310 denotes an iris part.

With the embodiment arranged in this manner, when the stepping motor 315 rotates, the rack member 316 which engages the output shaft 316a is driven in the direction of the optical axis. Then, the fourth lens group moving frame 314 which is attached to the rack member 316 moves in the direction of the optical axis to correct image plane fluctuations resulting from the magnifying-power-varying action or to perform a focusing action.

FIG. 24 is a development view of the cam mechanism of the cam ring 304. Referring to FIG. 24, a cam area a–b is a magnifying-power varying (shooting) area which is formed as a second cam part (area). A cam area b–c is a stowing (non-shooting or barrel retracting) area which is formed as a first cam part (area). The fixed cam roller 301b is fitted in a cam part 304b1 of the barrel retracting cam groove 304b extending perpendicular to the optical axis (in the direction of rotation). The second cam roller 306 is fitted in a cam part 304a1 of the second lens group cam 304a which has a lead (cam lift) slanting with respect to the optical axis.

In the sixth embodiment, with the second lens group moving frame 214 in a position indicated by a full line (a telephoto-end position) as shown in FIG. 22, when the zoom motor 309 rotates clockwise as indicated by an arrow, a power is transmitted to the cam ring inner gear part 304c via the output shaft 309a and the interlock gear 309b to cause the cam ring 304 to rotate clockwise in the direction of the arrow. In this instance, the fixed cam roller 301b is located in an area 304b1 of the cam groove 304b of the cam ring 304 where the cam groove 304b has no cam lift ("0" cam lift) as shown in FIG. 24. Therefore, the rotation of the cam ring 304 does not cause the first lens group L1 to move in the direction of the optical axis.

Meanwhile, the second lens group cam roller 306 is located in an area 304a1 where the cam groove 304a of the cam ring 304 has a cam lift. Therefore, the second lens group L2 moves along the optical axis, accordingly as the cam ring 304 rotate, to come to a position indicated by a two-dot chain line (to a wide-angle end position), as shown in FIG. 25. When the zoom motor 309 rotates counterclockwise, these actions are reversely performed.

When the second lens group cam roller 306 is drawn out toward the object side, the encoder slider 308 on the arm part 305 which is connected to the second lens group moving frame 305 is also drawn out toward the object side. The position information outputted from the encoder unit 307 then varies accordingly as the encoder slider 308 is drawn out. The output voltage of the encoder unit 307 is arranged to become lower when the encoder slider 308 moves toward the object side (when the magnifying-power varying action is performed from the telephoto end toward the wide-angle end) and to become higher when the encoder slider 308 moves toward the image side. Therefore, for example, if the second lens group cam roller 306 is located at a cam part 304a1 (the second cam part) within the cam area a–b, i.e., when the second lens group moving frame 305 moves alone in the direction of the optical axis, the output voltage of the encoder unit 307 becomes lower when the zoom motor 309 rotate clockwise (for the magnifying-power-varying action from the telephoto end toward the wide-angle end) and becomes higher when the zoom motor 309 rotate counterclockwise.

After the state of FIG. 24 is shifted to the state of FIG. 25 by causing the zoom motor 309 to rotate clockwise, the zoom motor 309 is caused to rotate further clockwise to bring about a non-shooting state. In other words, the position of the second lens group cam roller 306 is shifted to another cam area b–c. At this time, the cam ring 304 is moved toward the image side by the fixed cam roller 301b and the barrel retracting cam groove 304b. Then, following this, the front lens frame 302 is also drawn in toward the image side to eventually bring about the lens barrel retracted state shown in FIG. 23.

FIG. 26 corresponds to FIG. 23 and shows the positions of the fixed cam roller 301b and the second lens group roller 306 obtained at the cam ring 304. Then, since the second lens group moving frame 305 is located in the cam part 304a2 (area b–c) of the second lens group cam groove 304a extending perpendicular to the optical axis (in the direction of rotation), the second lens group moving frame 305 is also drawn in toward the image side together with the cam ring 304. The output voltage of the encoder unit 307 then becomes high as the encoder slider 308 also moves toward the image side with the second lens group moving frame 305 drawn inward.

When the second lens group cam roller 306 is at the cam part 304a2 (the first cam part) as shown in FIG. 26, that is, when the second lens group moving frame 305 and the front lens frame 302 are moving together along the optical axis, the level of the output voltage of the encoder unit 307 becomes high with the zoom motor 309 caused to rotate clockwise (in the direction of stowing) and becomes low with the zoom motor 309 caused to rotate counterclockwise, i.e., from a stowing position toward a shooting position. Table 1 shows the rotating directions of the zoom motor 309 as in relation to the level of the encoder unit 307.

TABLE 1

| | Output voltage of encoder 307: | |
|---|---|---|
| | becomes high | becomes low |
| Rotating direction of zoom motor 309: | | |
| right: | cam part b-c; front and second lens frames move toward image side. shooting → stowing | cam part a-b; second lens frame alone moves toward object side. telephoto end → wide-angle end |
| left: | cam part a-b; second lens frame alone moves toward image side. wide-angle end → telephoto end | cam part b-c; front and second lens frames move toward object side. stowing → shooting |

As apparent from Table 1 above, the state of the phototaking lens (zoom lens) can be detected by using a single encoder unit by detecting the rotating direction of the zoom motor 309 and the level of the encoder unit 307 to find whether the lens is in process of the magnifying-power-varying action (the cam area a–b) or retraction from the shooting state to the non-shooting, stowed state (the cam area b–c). A shooting operation thus can be carried out without any error by using one position detecting means.

Further, the embodiment may be arranged to use, as the magnifying-power-varying area, a cam area a–d between a cam position "a" and a cam position "d" located away from a cam position "b" where the output voltage of the encoder unit 307 is inverted, in such a way as to have the inverting cam position "b" included in the process of the barrel retracting action.

While the first lens group is arranged to be stationary when shooting is performed in the case of this particular embodiment, the arrangement is likewise applicable to a zoom lens of the kind having the first lens group arranged to move along the optical axis in carrying out magnifying-power-varying and focusing actions. In such a case, the optical position shown in FIG. 22 is assumed to represent a wide-angle end zoom position.

Figure 27:
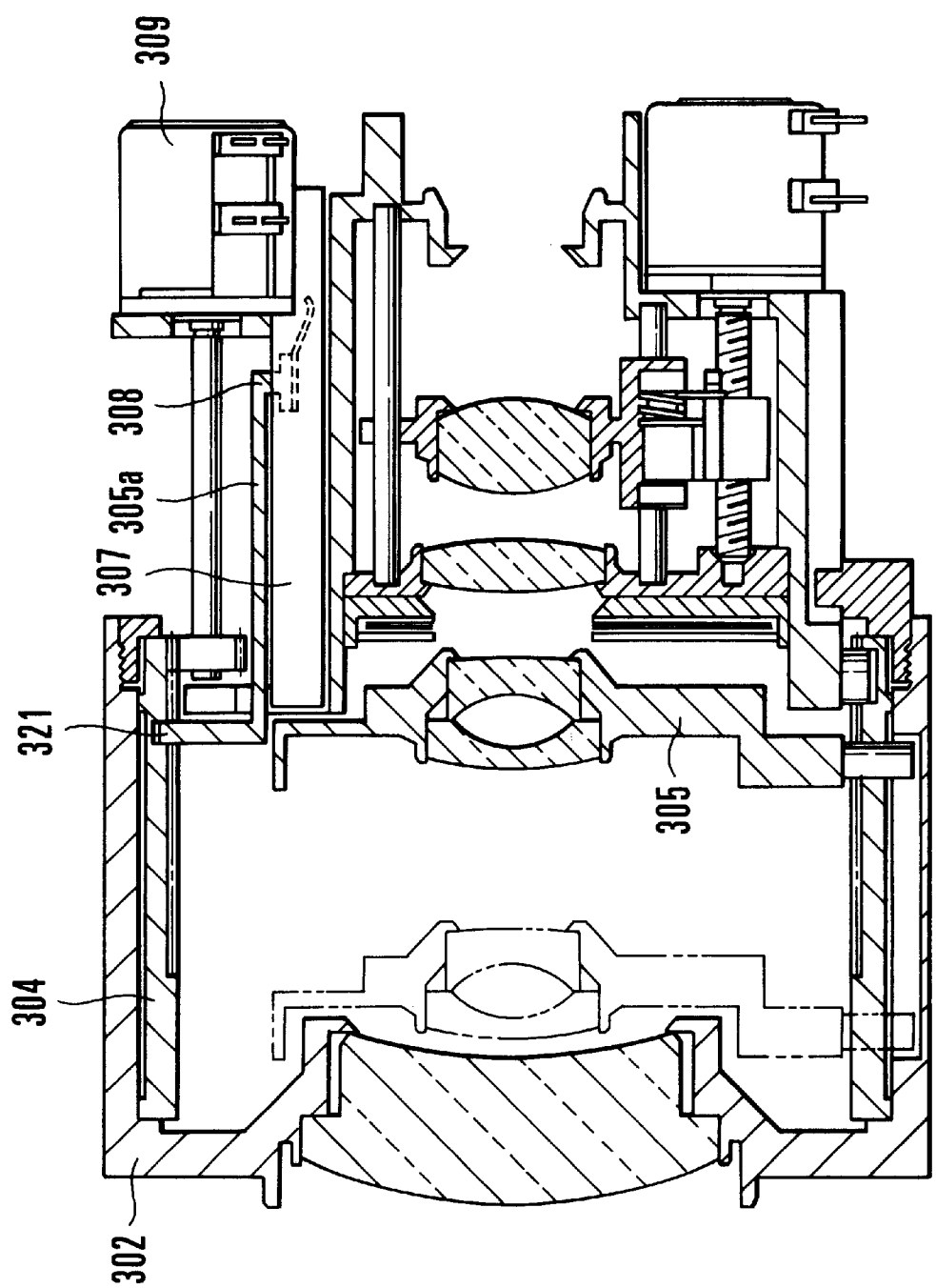
FIG. 27 is a sectional view showing the essential parts of a lens barrel which is a seventh embodiment of this invention as illustrated when shooting is performed.
Figure 28:
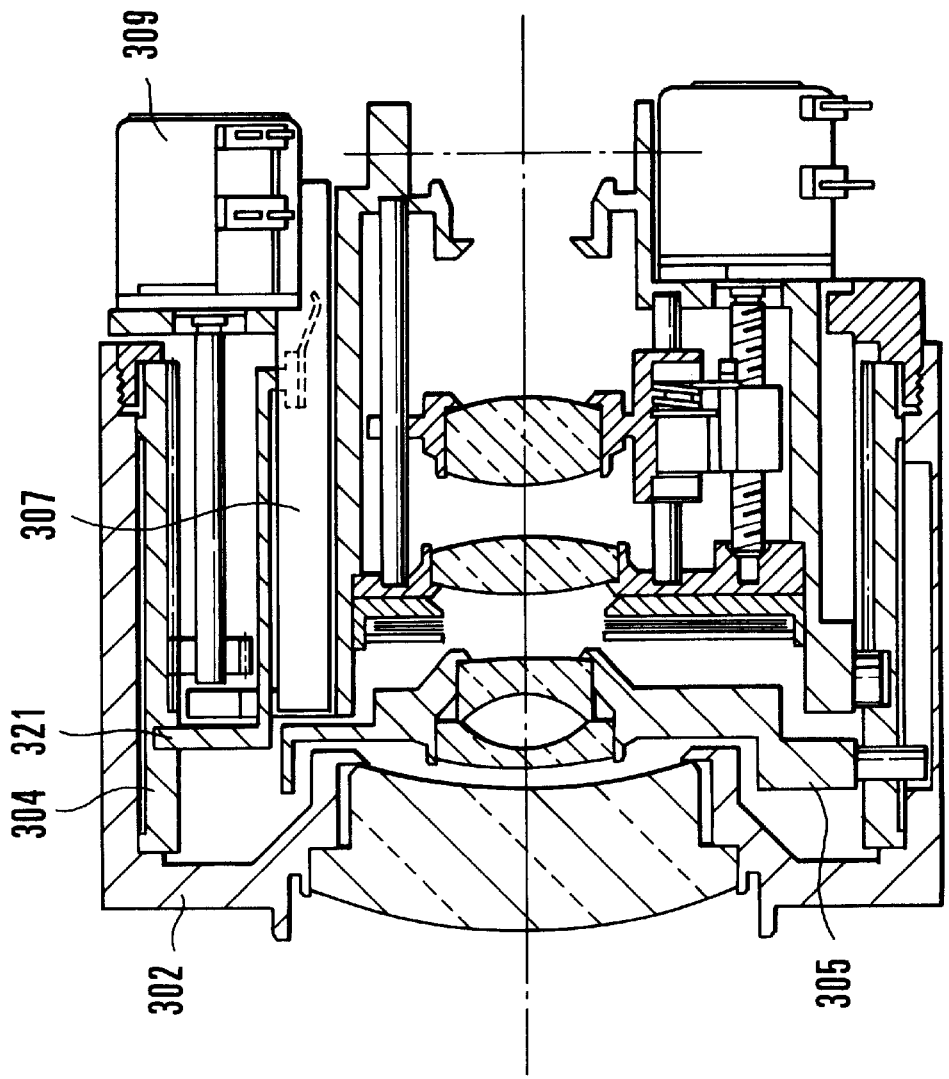
FIG. 28 is a sectional view showing the essential parts of the lens barrel which is the seventh embodiment as illustrated when shooting is not performed.
Figure 29:
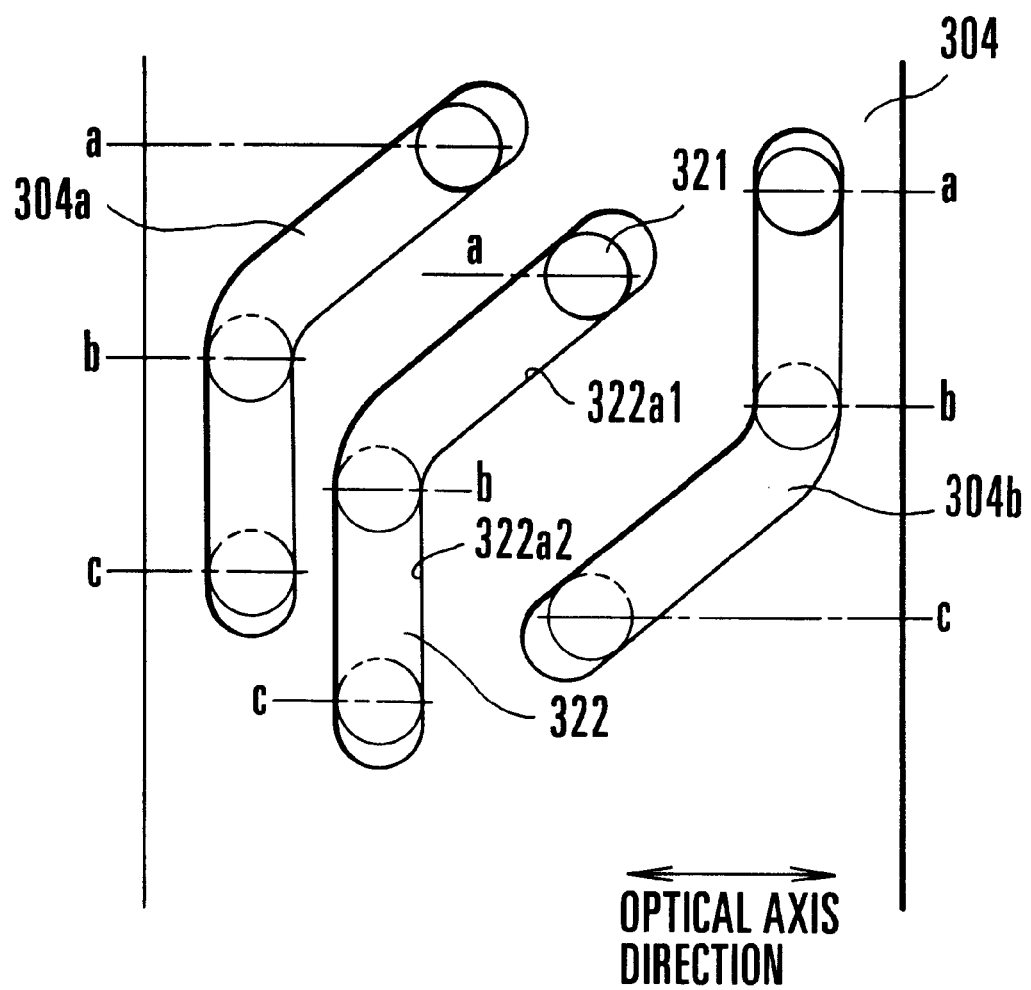
FIG. 29 is a development view showing the cam mechanism of a cam ring shown in FIG. 27.

FIGS. 27 and 28 are sectional views showing the essential parts of a lens barrel which is arranged as a seventh embodiment of this invention. FIG. 27 shows the lens barrel as in a shooting (or shootable) state and FIG. 28 as in a stowed state. FIG. 29 shows a part of FIG. 28.

The seventh embodiment differs from the sixth embodiment shown in FIGS. 22 and 23 only in the method for detecting, by the encoder unit 307, the position of the second lens group moving frame 305 on the optical axis. With the exception of this point, the seventh embodiment is arranged in the same manner as the sixth embodiment.

Referring to FIGS. 27 and 28, an encoder slider roller 321 extends from an arm part 305a which holds the encoder slider 308 and is fitted in a position detecting cam 322 provided in the cam ring 304 as shown in FIG. 29.

Referring to FIG. 29, in the seventh embodiment, when the cam ring 304 is rotated in a cam area 322a1 between points a and b, the cam ring 304 rotates in its position and the encoder slider roller 321 moves in the direction of the optical axis along the position detecting cam 322. When the cam ring 304 is rotated in a cam area 322a2 between points b and c, the cam ring 304 moves in the direction of the optical axis along the barrel retracting cam groove 304b to cause the encoder slider roller 321 to move in the direction of the optical axis.

The moving direction of the encoder slider roller 321 obtained in the cam area 322a1 between the points a and b is reversed in the cam area 322a2 between the points b and c. Therefore, the lens barrel retracting position and the magnifying-power-varying position can be detected from the rotating direction of the zoom motor 309 and the output voltage of the encoder unit 307 in the same manner as in the case of the sixth embodiment.

Figure 30:
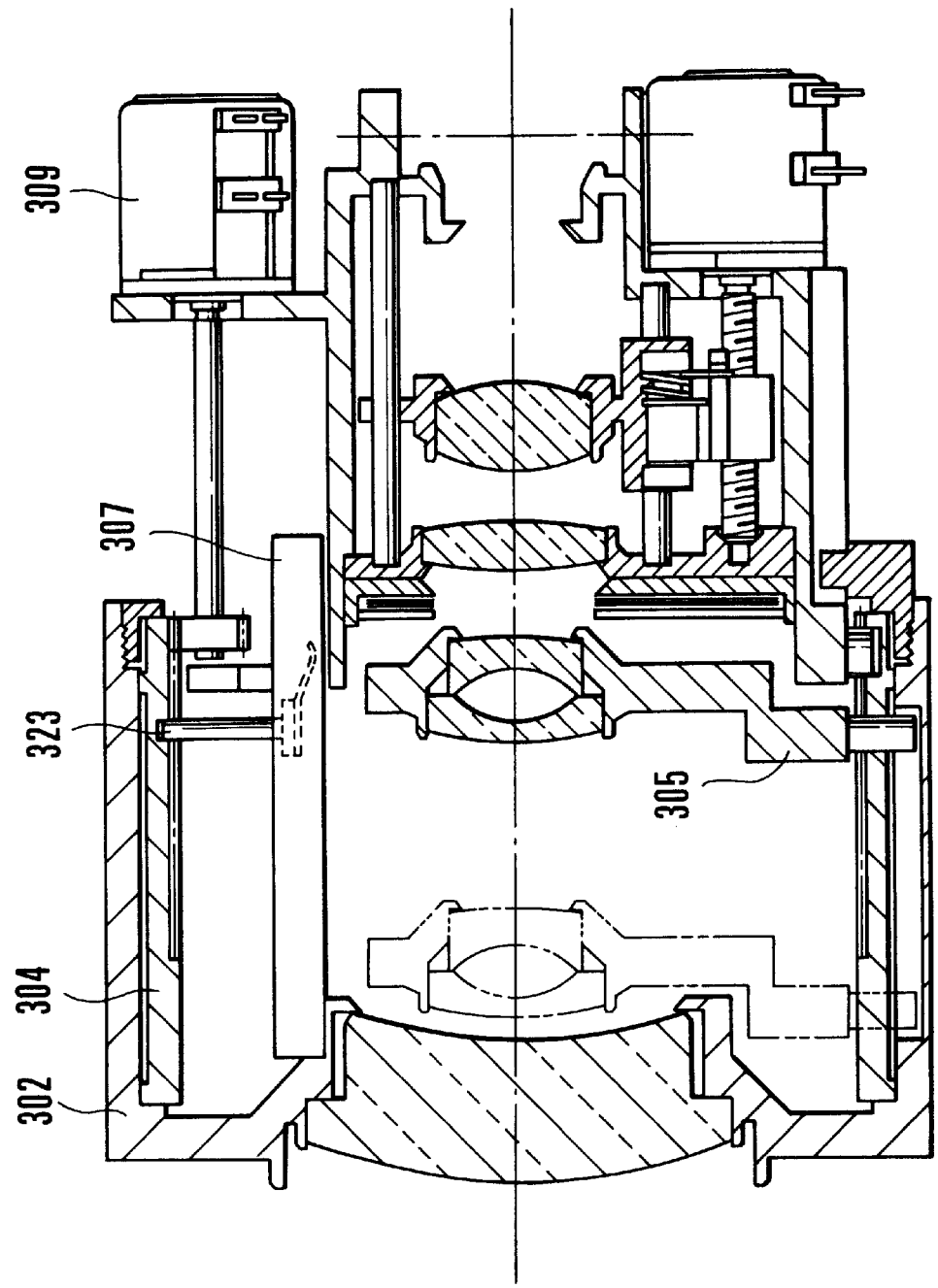
FIG. 30 is a sectional view showing the essential parts of a lens barrel which is an eighth embodiment of this invention as illustrated when shooting is performed.
Figure 31:
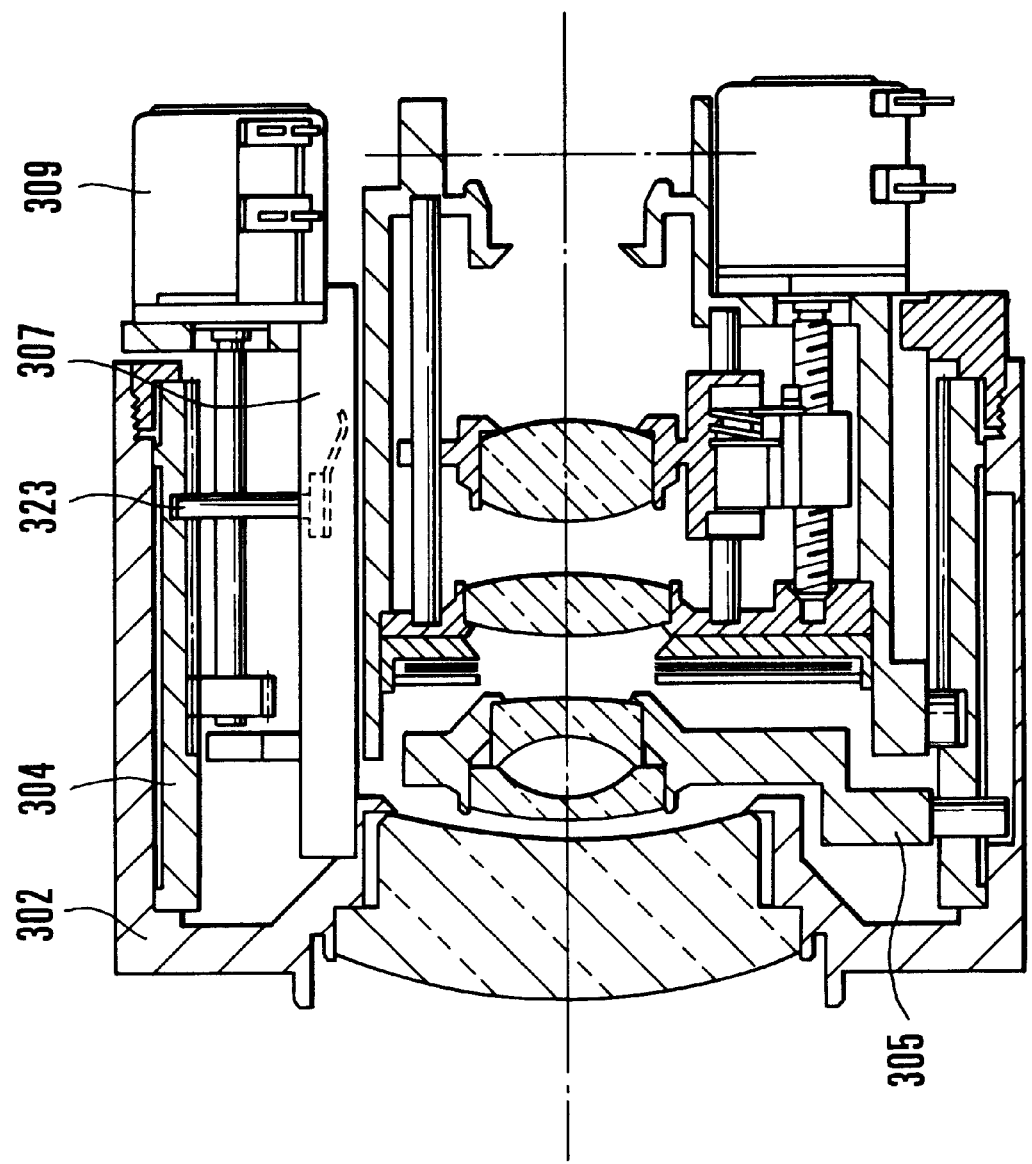
FIG. 31 is a sectional view showing the essential parts of the lens barrel which is the eighth embodiment as illustrated when shooting is not performed.
Figure 32:
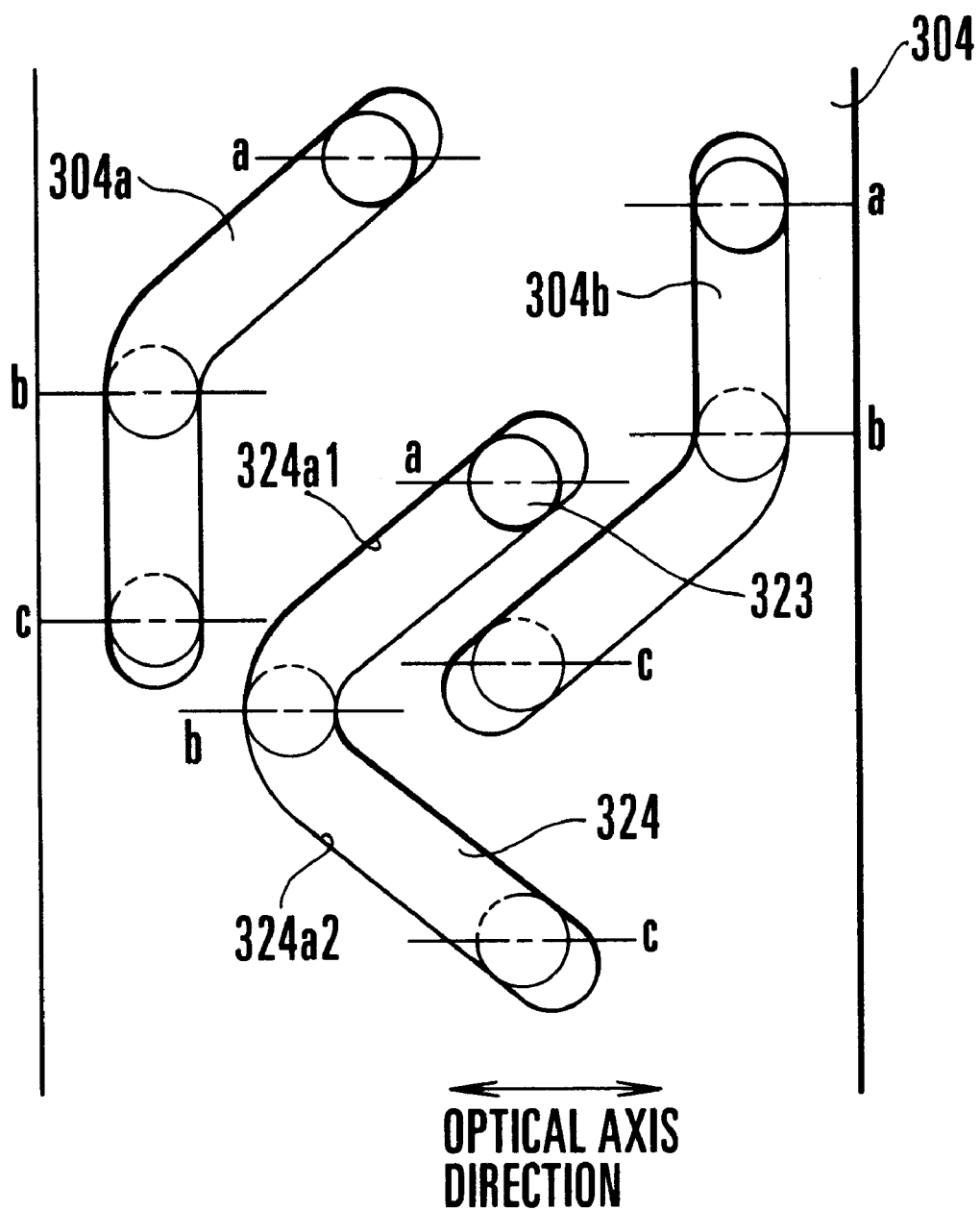
FIG. 32 is a development view showing the cam mechanism of a cam ring shown in FIG. 30.

FIGS. 30 and 31 are sectional views showing the essential parts of the lens barrel with is arranged as an eighth embodiment of this invention. FIG. 30 shows the lens barrel as in a shooting state and FIG. 31 as in a stowed (barrel retracted state) state. FIG. 32 shows a part of FIG. 31.

The eighth embodiment differs from the sixth embodiment shown in FIGS. 22 and 23 only in the method for detecting the position on the optical axis of the second lens group moving frame 305 by the encoder unit 307. With the exception of this point, the eighth embodiment is arranged in the same manner as the sixth embodiment. Referring to FIGS. 30 and 31, the encoder unit 307 is secured to the front lens frame 302. An encoder slider roller 323 of the encoder unit 307 is fitted in a position detecting cam 324 as shown in FIG. 32.

Referring to FIG. 32, in the eighth embodiment, when the cam ring 304 rotates, the encoder slider roller 323 moves along the position detecting cam 324 in the direction of the optical axis, as the position detecting cam 324 and the cam ring 304 do not move with respect to the front lens frame 302 in the direction of the optical axis. The rotating direction of the cam ring 304 and the moving direction of the encoder slider roller 323 obtained in a cam area 324a1 between points a and b are reversed in another cam area 324a2 between points b and c. Therefore, like in the case of the sixth embodiment, the lens barrel retracting position and the magnifying-power-varying position (zooming position) are detected from the rotating direction of the zoom motor 309 and the direction in which the output voltage of the encoder unit 307 varies.

For reducing the total lens length by carrying out a lens barrel retracting action with some of the lens groups on the object side drawn in when shooting is not performed, each of the sixth to eighth embodiments of this invention is arranged to be capable of detecting whether the lens is in process of shooting or in process of retracting the lens barrel, by a simple arrangement which permits adequate shooting. The arrangement effectively permits reduction in size of the whole optical apparatus when the apparatus is not in use. Therefore, the arrangement of the embodiments described provides a lens barrel which is highly advantageous, for example, for a camera-integrated type video camera having improved portability or an optical apparatus using the lens barrel.

What is claimed is:

1. A lens barrel comprising:
    a plurality of lenses including a lens disposed nearest to an object side;
    a holding member for holding said lens, said holding member being fixed when each of zooming and focusing is performed; and
    driving means for moving said holding member toward an image side when the zooming and focusing are not performed.

2. A lens barrel according to claim 1, said plurality of lenses further comprising a second lens, and said lens barrel further comprising a second holding member for holding said second lens, said second holding member being arranged to move along the optical axis for varying a magnifying power and/or focusing when shooting is performed.

3. A lens barrel according to claim 2, wherein said driving means is arranged to cause said holding member to move along the optical axis toward the image side at the same time that said driving means causes said second holding member to move along the optical axis.

4. A lens barrel according to claim 3, wherein said driving means is arranged to cause said second holding member to move to a position located nearest to the object side in a range within which said second holding member is movable when shooting is performed.

5. A lens barrel according to claim 2, wherein said driving means is arranged to cause said holding member to move along the optical axis toward the image side after causing said second holding member to move along the optical axis to a predetermined position.

6. A lens barrel according to claim 5, wherein the predetermined position is a position located nearest to the object side in a range within which said second holding member is movable when shooting is performed.

7. A lens barrel according to claim 1, further comprising a member for imposing a load on said holding member in one direction when shooting is performed.

8. A lens barrel according to claim 2, wherein said driving means has a helicoid mechanism.

9. A lens barrel according to claim 2, wherein said driving means has a cam mechanism.

10. A lens barrel according to claim 9, wherein said cam mechanism includes a first cam for driving said holding member and said second holding member when shooting is not performed and a second cam for driving said second holding member when shooting is performed, and wherein said first and second cams are arranged to cause said holding member and said second holding member to move along the optical axis without changing a positional relation between said holding member and said second holding member when shooting is not performed and to cause said second holding member to move along the optical axis while keeping said holding member fixed in the direction of the optical axis when shooting is performed.

11. A lens barrel according to claim 10, wherein said cam mechanism is arranged to perform zooming with said second lens by causing said second holding member to move along the optical axis when shooting is performed.

12. A lens barrel according to claim 11, wherein, when shooting is not performed, said second holding member is moved to a telephoto end position in a range within which said second holding member is movable for the zooming.

13. A lens barrel according to claim 10, wherein said first and said second cams are formed in a common cam ring.

14. A lens barrel according to claim 13, wherein said first and second cams are different parts of a single cam.

15. A lens barrel according to claim 13, wherein said first and second cams are separate cams.

16. A lens barrel according to claim 13, further comprising position detecting means for detecting a position of said second holding member in the direction of the optical axis, an output of said position detecting means being arranged to increase or decrease in response to a change in the position of said second holding member,
    wherein said cam mechanism is arranged such that a direction in which the output of said position detecting means varies when said cam ring is rotated in a certain direction to cause said second holding member to be moved by said first cam and a direction in which the output of said position detecting means varies when said cam ring is rotated in the same direction to cause said second holding member to be moved by said second cam are reverse to each other.

17. A lens barrel according to claim 16, wherein said holding member and said second holding member are arranged to move toward an image side along the optical axis when shooting is not performed.

18. An apparatus comprising:
    a plurality of lenses including a lens disposed nearest to an object side;
    a holding member for holding said lens, said holding member being fixed when each of zooming and focusing is performed; and
    driving means for moving said holding member toward an image side when the zooming and focusing are not performed.

19. An apparatus according to claim 18, said plurality of lenses further comprising a second lens, and said apparatus further comprising a second holding member for holding said second lens, said second holding member being arranged to move along the optical axis for varying a magnifying power and/or focusing when shooting is performed.

20. An apparatus according to claim 19, wherein said driving means is arranged to cause said holding member to move along the optical axis toward the image side at the same time that said driving means causes said second holding member to move along the optical axis.

21. An apparatus according to claim 20, wherein said driving means is arranged to cause said second holding member to move to a position located nearest to the object side in a range within which said second holding member is movable when shooting is performed.

22. An apparatus according to claim 19, wherein said driving means is arranged to cause said holding member to move along the optical axis toward the image side after causing said second holding member to move along the optical axis to a predetermined position.

23. An apparatus according to claim 22, wherein said predetermined position is a position located nearest to the object side in a range within which said second holding member is movable when shooting is performed.

24. An apparatus according to claim 19, wherein said driving means has a helicoid mechanism.

25. An apparatus according to claim 19, wherein said driving means has a cam mechanism.

26. An apparatus according to claim 25, wherein said cam mechanism includes a first cam for driving said holding member and said second holding member when shooting is not performed and a second cam for driving said second holding member when shooting is performed, and wherein said first and second cams are arranged to cause said holding member and said second holding member to move along the optical axis without changing a positional relation between said holding member and said second holding member when shooting is not performed and to cause said second holding member to move along the optical axis while keeping said holding member fixed in the direction of the optical axis when shooting is performed.

27. An apparatus according to claim 26, wherein said cam mechanism is arranged to perform zooming with said second lens by causing said second holding member to move along the optical axis when shooting is performed.

28. An apparatus according to claim 27, wherein, when shooting is not performed, said second holding member is moved to a telephoto end position in a range within which said second holding member is movable for the zooming.

29. An apparatus according to claim 26, wherein said first and said second cams are formed in a common cam ring.

30. An apparatus according to claim 29, wherein said first and second cams are different parts of a single cam.

31. An apparatus according to claim 29, wherein said first and second cams are separate cams.

32. An apparatus according to claim 29, further comprising position detecting means for detecting a position of said second holding member in the direction of the optical axis, an output of said position detecting means being arranged to increase or decrease in response to a change in the position of said second holding member, wherein said cam mechanism is arranged such that a direction in which the output of said position detecting means varies when said cam ring is rotated in a certain direction to cause said second holding member to be moved by said first cam and a direction in which the output of said position detecting means varies when said cam ring is rotated in the same direction to cause said second holding member to be moved by said second cam are reverse to each other.

33. An apparatus according to claim 18, further comprising a member for imposing a load on said holding member in one direction when shooting is performed.

\* \* \* \* \*

UNITED STATES PATENT AND TRADEMARK OFFICE
CERTIFICATE OF CORRECTION

PATENT NO. : 6,002,530

DATED : December 14, 1999

INVENTOR(S) : Shigeo NAKASHIMA, et al.

It is certified that error appears in the above-identified patent and that said Letters Patent is hereby corrected as shown below:

COLUMN 5:

Line 30, "13(C), and 13(D)" should read
--13(B), and 13(C)--.
Line 32, "14(C), and 14(D)" should read
--14(B), and 14(C)--.
Line 50, "21(C), and 21(D)" should read
--21(B), and 21(C)--.

COLUMN 7:

Line 20, "Li" should read --L1--.
Line 23, "S," should read --S5,--.

COLUMN 13:

Line 4, "13(C), and 13(D)" should read --13(B), and 13(C)--.
Line 7, "13(C)" should read --13(B)--.
Line 8, "13(D)" should read --13(C)--.
Line 19, "14(C), and 14(D)" should read --14(B) and 14(C)--.
Line 22, "13(C), and 13(D)." should read
--13(B), and 13(C).--.
Line 28, "14(C)" should read --14(B)--.
Line 29, "14(D)" should read --14(C)--.
Line 35, "14(C)" should read --14(B)--.

UNITED STATES PATENT AND TRADEMARK OFFICE
CERTIFICATE OF CORRECTION

PATENT NO. : 6,002,530

DATED : December 14, 1999

INVENTOR(S) : Shigeo NAKASHIMA, et al.

It is certified that error appears in the above-identified patent and that said Letters Patent is hereby corrected as shown below:

COLUMN 13:

Line 36, "14(D)" should read --14(C)--.

COLUMN 14:

Line 5, "have" should read --has--.

COLUMN 16:

Line 19, "21(C)" should read --21(B)--.
Line 25, "21(D)" should read --21(C)--.
Line 27, "ring. The" should read --ring, the--.

COLUMN 17:

Line 29, "same" should read --sake--.
Line 48, "cams groove" should read --cam grooves--.

COLUMN 18:

Line 51, "rotate," should read --rotates,--.

UNITED STATES PATENT AND TRADEMARK OFFICE
CERTIFICATE OF CORRECTION

PATENT NO.   :   6,002,530

DATED        :   December 14, 1999

INVENTOR(S)  :   Shigeo NAKASHIMA, et al.

It is certified that error appears in the above-identified patent and that said Letters Patent is hereby corrected as shown below:

COLUMN 19:

Line 6, "rotate" should read --rotates--.
Line 8, "rotate" should read --rotates--.

COLUMN 23:

Line 14, "said" should read --the--.

Signed and Sealed this

Twenty-fourth Day of April, 2001

Attest:

NICHOLAS P. GODICI

Attesting Officer      Acting Director of the United States Patent and Trademark Office